US005745481A

United States Patent [19]
Phillips et al.

[11] Patent Number: 5,745,481
[45] Date of Patent: Apr. 28, 1998

[54] MESSAGE SYSTEM AND METHOD FOR EFFICIENT MULTI-FREQUENCY ROAMING

[75] Inventors: W. Garland Phillips, Arlington; Jheroen P. Dorenbosch, Paradise; Terence Edward Sumner, Azle, all of Tex.

[73] Assignee: Motorola, Inc.

[21] Appl. No.: 657,267

[22] Filed: Jun. 3, 1996

[51] Int. Cl.$^6$ .................................................. H04J 3/16
[52] U.S. Cl. ........................ 370/313; 370/331; 455/33.2
[58] Field of Search ................................ 370/310, 311, 370/312, 321, 322, 329, 330, 331, 337, 347, 349, 350, 313, 314, 319, 341, 343, 345, 389, 465, 466, 467, 475, 480, 503; 455/57.1, 33.1, 32.1, 33.2, 56.1, 58.1; 379/60, 58, 59

[56] References Cited

U.S. PATENT DOCUMENTS

| | | | |
|---|---|---|---|
| 4,718,109 | 1/1988 | Breeden et al. | 455/51 |
| 5,128,665 | 7/1992 | Deluca et al. | 340/825.47 |
| 5,168,493 | 12/1992 | Nelson et al. | 370/84 |
| 5,311,516 | 5/1994 | Kuznicki et al. | 370/411 |

OTHER PUBLICATIONS

Oppenheim, Alan V. and Schafer, Ronald W., "Discrete-Time Signal Processing," Prentice Hall, Englewood Cliffs, NJ, 1989.

*Primary Examiner*—Dang Ton
*Attorney, Agent, or Firm*—Pablo Meles

[57] ABSTRACT

A messaging system capable of transmitting messages to receivers which roam between coverage areas. In one configuration, a coverage area (600) is divided into a plurality of zones (605, 610, 615). A single simulcast system identification (SSID) number is assigned which consists of a local identification number which identifies the coverage area (600), a zone identifier which identifies a zone (610) within the coverage area, traffic splitting flags and a frequency. For larger roaming areas, a network is defined as consisting of a plurality of service areas and is identified by network identification information (NID). NID information and/or SSID information along with a priority value is stored in a receiver according to desired coverage and like information is transmitted in the corresponding zone or service area and the roaming pager operates on the frequency having the NID or SSID having the highest priority.

20 Claims, 21 Drawing Sheets

FIG. 4

| 1 2 3 4 5 6 7 ... 21 ... 31 32 | PARITY | CK |
|---|---|---|
| x0 x1 x2 x3 c0 c1 c2 c3 f0 f1 f2 f3 f4 f5 f6 n0 r0 t0 t1 t2 t3 p p p p p p p p | | |
| 0 0 1 1 1 0 0 0 0 1 1 1 1 0 0 1 1 1 0 0 0 0 0 1 | | |

FIG. 5

| 1 2 3 4 5 6 7 ... 21 ... 31 32 | PARITY | CK |
|---|---|---|
| x0 x1 x2 x3 P0 P1 P2 P3 a0 a1 v0 v1 v2 v3 v4 v5 c0 c1 m0 m1 m2 p p p p p | | |
| 0 1 0 1 0 1 0 1 0 0 1 1 1 1 0 0 1 1 | | |

FIG. 6

| 1 2 3 4 5 6 7 ... 21 ... 31 32 | PARITY | CK |
|---|---|---|
| x0 x1 x2 x3 f0 f1 f2 s0 s1 s2 s3 s4 s5 s6 s7 s8 s9 s10 s11 s12 s13 p p p p p | | |
| 1 1 0 1 1 0 0 1 0 0 1 0 0 1 1 1 1 0 0 1 1 | | |

| FRAME | A | B | C | D |
|---|---|---|---|---|
| 0 | LID1 T<br>LID2 | T | T | T |
| 1 | | LID1<br>LID2 | | |
| 2 | | | LID1<br>LID2 | |
| 3 | | | | LID1<br>LID2 |
| 4 | LID1 | | | |
| 5 | | LID1 | | |
| 6 | | | LID1 | |
| 7 | | | | LID1 |
| 8 | LID1 | | | |
| 9 | | LID1 | | |
| 10 | | | LID1 | |
| 11 | | | | LID1 |
| 12 | LID1 | | | |
| 13 | | LID1 | | |
| 14 | | | LID1 | |
| 15 | | | | LID1 |
| 16 | LID1 | | | |
| 17 | | LID1 | | |
| 18 | | | LID1 | |
| 19 | | | | LID1 |
| 20 | LID1 | | | |
| ⋮ | | | | |
| 127 | | | | LID1 |

*FIG. 11*

| FRAME | A | B | C | D |
|---|---|---|---|---|
| 0 | LID1 LID2 N1 | T T2 | T1 T2 | T1 T2 |
| 1 | | LID1 LID2 N2 | | |
| 2 | | | LID1 LID2 N3 | |
| 3 | | | | LID1 LID2 N4 |
| 4 | LID1 N5 | | | |
| 5 | | LID1 N6 | | |
| 6 | | | LID1 N7 | |
| 7 | | | | LID1 N8 |
| 8 | LID1 N9 | | | |
| 9 | | LID1 N10 | | |
| 10 | | | LID1 N1 | |
| 11 | | | | LID1 N2 |
| 12 | LID1 N3 | | | |
| 13 | | LID1 N4 | | |
| 14 | | | LID1 N5 | |
| 15 | | | | LID1 N6 |
| 16 | LID1 N7 | | | |
| 17 | | LID1 N8 | | |
| 18 | | | LID1 N9 | |
| 19 | | | | LID1 N10 |
| ⋮ 127 | LID1 N1 | | | LID1 |

*FIG. 12*

| FRAME | A | B | C | D |
|---|---|---|---|---|
| 0 | LID1 LID2 N1 | T    T | T | T |
| 1 |  | LID1 LID2 |  |  |
| 2 |  |  | LID1 LID2 |  |
| 3 |  |  |  | LID1 LID2 N4 |
| 4 | LID1 N5 |  |  |  |
| 5 |  | LID1 N7  N6 |  |  |
| 6 |  |  | LID1 |  |
| 7 |  |  |  | LID1 N8 |
| 8 | LID1 N9 |  |  |  |
| 9 |  | LID1 N10 |  |  |
| 10 |  |  | LID1 |  |
| 11 |  |  |  | LID1 |
| 12 | LID1 |  |  |  |
| 13 |  | LID1 N2 |  |  |
| 14 |  |  | LID1 |  |
| 15 |  |  |  | LID1 N3 |
| 16 | LID1 |  |  |  |
| 17 |  | LID1 |  |  |
| 18 |  |  | LID1 |  |
| 19 |  |  |  | LID1 |
| • | LID1 |  |  |  |
| • |  |  |  |  |
| • |  |  |  |  |
| • |  |  |  |  |
| 127 |  |  |  | LID1 |

*FIG. 13*

# MESSAGE SYSTEM AND METHOD FOR EFFICIENT MULTI-FREQUENCY ROAMING

FIELD OF THE INVENTION

The present invention relates to messaging systems, and more particularly to a messaging system having the capability for a receiver to roam and receive messages efficiently across a multitude of coverage areas having a multitude of frequencies.

BACKGROUND OF THE INVENTION

In today's mobile society, it is desirable to be reachable, such as, by a selective call receiver (pager), everywhere one travels, both locally close to home, as well as in more distant locations in the same country or across the world. Currently, such systems create some inefficiencies in the use of the available radio frequency (RF) spectrum creating unnecessary channel traffic. Additionally, the manner in which channel congestion is presently handled in such roaming systems further creates unnecessary channel traffic as well as latency. Finally, the inability to provide an indication as to the status of registration to a roaming user of a one-way selective call receiver may defeat the purpose of getting a message to an intended user. It should be understood that it is no trivial task to provide registration status information to a user of a roaming one-way pager since the registration process is typically thought of as a two-way communication concept.

Thus, what is needed is a messaging method and system that is capable of accommodating roaming portable communication receivers, such as pagers, between coverage areas of the same service provider and across coverage areas of different service providers, yet efficiently uses the RF spectrum available. Ideally, such a system will suitably handle congestion and further provide for portable communication receivers that indicate the status of registration of the roaming device.

SUMMARY OF THE INVENTION

In a first aspect of the present invention, a method for efficient multi-frequency roaming and messaging for a plurality of selective call receivers in a selective call messaging system using identifiers on various communication resources recognized by at least one of the plurality of selective call receivers comprises the steps of storing a priority value assigned to at least one of the identifiers for at least one of the plurality of selective call receivers in a memory location. Then, matching the at least one identifier with at least one of the identifiers on the available communication resources found at the output controller terminal providing an identifier with a highest priority value. Finally, transmitting the associated message on the available communication resource having the identifier with the highest priority value.

In another aspect of the present invention, an efficient multi-frequency roaming and selective call messaging system that uses at least one identifier on various communication resources, where the identifier stored and recognized by at least one of a plurality of selective call receivers used within the selective call messaging system comprises a home input terminal and an output controller terminal. The home input terminal stores a priority value assigned to at least one identifier for at least one of the plurality of selective call receivers in a memory location. The output controller terminal is networked to the home input terminal and assigns communication resources. The output controller terminal also receives the priority value and an associated message from the home input terminal, wherein the identifier having the highest priority is used for transmission of the associated message.

BRIEF DESCRIPTION OF THE DRAWINGS

FIG. 4 illustrates a structure of a frame information word according to the present invention.

FIGS. 5 and 6 illustrate structures of block information words in which single simulcast identification (SSID) information is coded.

FIG. 11 is frame diagram illustrating the placement of the SSID and time information in accordance with the present invention.

FIG. 12 is a frame diagram illustrating a first placement configuration of the Network Identifier (NID) information in accordance with the present invention.

FIG. 13 is a frame diagram illustrating a second placement configuration of the NID information in accordance with the present invention.

DETAILED DESCRIPTION OF THE DRAWINGS

The present invention is directed to a selective call communication system capable of servicing or transmitting messages to receivers roaming between coverage areas. An example of a selective call signaling system to which the present invention relates is disclosed in commonly assigned U.S. Pat. No. 5,128,665. The entire text and drawings of U.S. Pat. No. 5,128,665 are herein incorporated by reference. The present invention, however, is not in any way limited to a particular type of signaling protocol, and has utility in many types of communication systems, a paging or messaging system being only an example.

Figure 1:
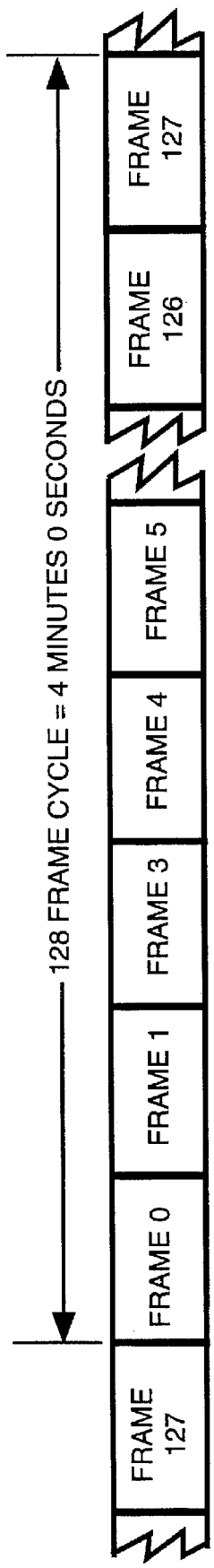
FIGS. 1–3 are timing diagrams illustrating a signaling protocol in accordance with the present invention.
Figure 2:
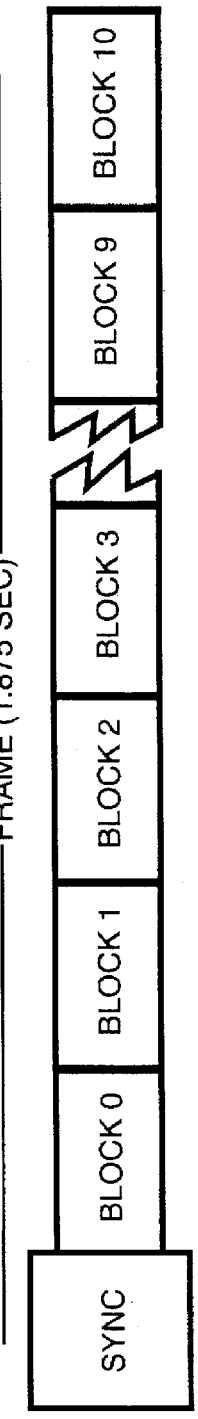
Figure 3:
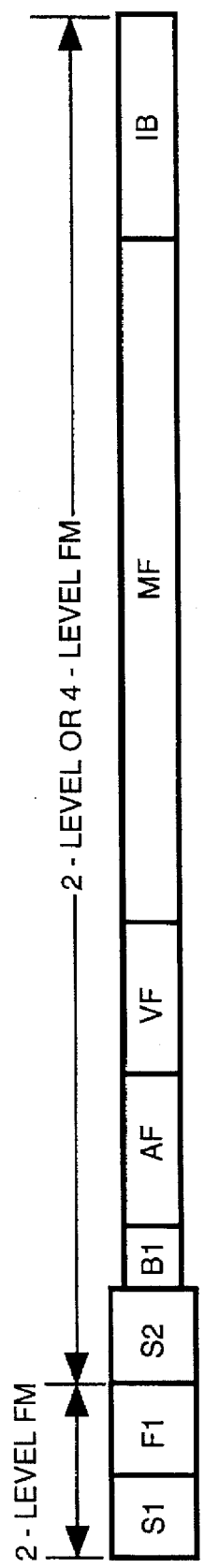

Referring to FIGS. 1-3, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame comprises a sync portion and several blocks. The sync portion further comprises a Sync 1 portion (S1), a frame information (FI) word and a Sync 2 portion (S2).

Each receiver is assigned a base frame in the set of 128 frames appearing on an radio frequency (RF) channel. A receiver can trade battery life for the more frequent delivery of messages by being assigned to monitor more than one frame per cycle. This can be done by altering a collapse value or indicating a carry-on. In any event, once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 3, the Sync 1 (S1) portion of each frame provides for frame timing, symbol timing and indicates the speed of the remainder of the frame. The frame information (FI) word carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 4.

The Sync 2 (S2) portion provides for synchronization at the frame's block speed to allow for proper de-multiplexing and decoding of the blocks.

The Block Information (BI) field is the first 1-4 words, called block information worlds, of the first interleaved block and contains frame and system structure information, some of which is pertinent to the present invention and is explained in greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 4 illustrates the structure of the frame information word in greater detail. The various parameters in the frame information word are defined as follows:

C  Cycle Number (0-14)      $c_3c_2c_1c_0$ 15/hour
f  Frame Number (0-127)     $f_6f_5f_4f_3f_2f_1f_0$ 128/cycle
n  Network Roaming Channel Bit  n=1 indicates network support for roaming and n=0 indicates no network support for roaming
r  Repeat Paging Indciator
   If r=1, $t_3t_2t_1t_0$ are reserved to indicate a repeat format exists
   If r=0, $tt_3t_2t_1t_0$ are Low Traffic flags for each phase in a frame
t  Definition dependent on value of "r"
   At 3200 bits/sec $t_3=t_2$ and $t_1=t_0$ representing two phases in the frame
   At 1600 bits/sec $t_3=t_2=t_1=t_0$ representing one pahse in the frame
   t=1  Indicates address field contained in block 0
   t=0  Indicates address field extends past block 0
   These flags give early indication that the traffic is light and all addresses are contained within block 0.
x  Standard 4 bit Check Character FIG. 5 illustrates an example of block information word 1. Block information word 1 has 2 "a" bits, a0a1, which indicate the start of the address field, 6 "v" bits v5v4v3v2v1v0 which define the start of the vector field, 2 "c" bits c1c0 which indicate traffic overflow into the next frame(s), 3 "m" bits m0m1m2 which indicate the number of high order frame number bits to be masked and 4 "P" bits P3P2P1P0, which indicate the number of priority addresses at the beginning of the address field.

FIG. 6 illustrates an example of block information words 2, 3 and 4. Word Format Type is represented by format bits f2f1f0, s represents the data and x again is the standard 4 bit Check Character.

Below is a table which illustrates the bit pattern definitions for the f and s bits shown in FIG. 6. Depending on the values of bits f2f1f0, the data bits s13-s0 have a particular meaning or application. When f2f1f0 is set to (000), bits s13-s0 represent a 9 bit local identification (LID) number (i8-i0) which identifies 512 possible LID's, and a 5 bit Zone number C4C3C2C1C0, which represents 32 possible coverage Zones associated with a particular LID.

| $f_2$ | $f_1$ | $f_0$ | $s_{13}s_{12}s_{11}s_{10}s_9s_8s_7s_6s_5s_4s_3s_2s_1s_0$ | |
|---|---|---|---|---|
| 0 | 0 | 0 | $i_8i_7i_6i_5i_4i_3i_2i_0C_4C_3C_2C_1C_0$ | 512 Local IDs, 32 Coverage Zones |
| 0 | 0 | 1 | $m_3m_2m_1m_0d_4d_3d_2d_1d_0Y_4Y_3Y_2Y_1Y_0$ | Month, Day, Year |
| 0 | 1 | 0 | $S_2S_1S_0M_5M_4M_3M_2M_1M_0H_4H_3H_2H_1H_0$ | Sec., Min., Hr. |
| 0 | 1 | 1 | Reserved for Future Use | |
| 1 | 0 | 0 | Reserved for Future Use | |
| 1 | 0 | 1 | $z_9z_8z_7z_6z_5z_4z_3z_2z_1z_0A_3A_2A_1A_0$ | Data, System Message |
| 1 | 1 | 0 | Reserved for Future Use | |
| 1 | 1 | 1 | $C_9C_8C_7C_6C_5C_4C_3C_2C_1C_0T_3T_2T_1T_0$ | Country Code, Traffic Splitting Flags |

Figure 7:
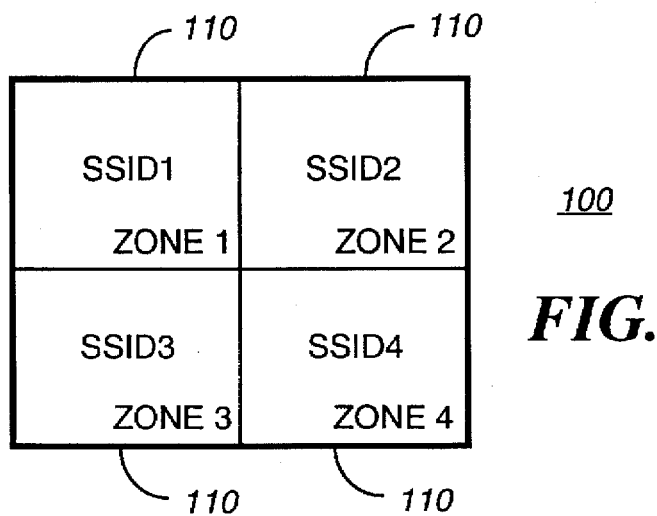
FIG. 7 illustrates a coverage area and zone divisions in accordance with the present invention.

When f2f1f0 is set to (001) and (010), the data bit pattern s13–s0 represents month, day, year, second minute and hour information as shown in FIG. 7. The f2f1f0 bit pattern (101) designates spare data bits s13–s9, a system message A3–A0 and time zone information Z3–Z0.

Finally, of importance is the f2f1f0 bit pattern (111), which indicates a 10 bit Country Code c9–c0 and 4 bits called Traffic Splitting Flags, both of which will be described in more detail hereinafter.

The Country Codes follow, for example, the CCITT Standard which is well known in the art. The 10-bit Country Code is provided to permit reuse of LID's in different countries, following the CCITT standard assignment rules. Country Code information is useful by the nonsubscribing receiver to facilitate a more efficient scan search by first identifying in what country the receiver is located.

With reference to FIG. 7, the smallest division of a coverage area 100 is defined by a simulcast system identification (SSID). An SSID consists of and is uniquely identified by several identifiers: an LID, Zone, Country Code, Traffic Splitting Flags (TSF's) or Traffic Message Flags (TMF's) and Frequency. Each Zone 110 has a unique SSID. Thus, if a user desires to receive messages in more than one Zone, the receiver carried by that user would store each of the corresponding SSID's. The Zones shown in FIG. 7 need not be geographically adjacent one another.

In the example shown in FIG. 7, there are 512 possible LID's, each with 32 possible Zones. A "Zone" is a single simulcast area which may be associated with other simulcast areas in a coverage area through a common LID. For example, a service provider is given LID 123456789XXXXX. The service provider has the option to assign this LID to 32 different divisions of a coverage area or Zone. The northern part of a service provider's coverage area may be Zone 1 and would transmit 12345678900001, whereas a southern part is Zone 2 and transmits 12345678900010.

The Traffic Splitting Flags (TSF's or TMF's) indicate the assignment of 4 groups of roaming traffic to a frequency (channel). Each roaming receiver which finds a frequency to carry a valid LID responds to only one of the 4 Traffic Splitting Flags. When a receiver's assigned flag is equal to 0, the receiver searches for another frequency with the same LID and the assigned flag set equal to 1.

The SSID information is coded into two words:

| 1st Word (000) | 9 bits = 512 LID's |
| | 5 bits = 32 Zones |
| 2nd Word (111) | 10 bits = 1024 Country Codes |
| | 4 bits = Traffic Splitting Flags |

The 1st Word, called LID1 hereinafter, corresponds to the first Block information word (000) referred to in FIG. 3, and the 2nd Word, called LID2, corresponds to Block information word (111).

Time and calendar information (block information words f2f1f0=001, 010 and 101) when transmitted, are defined to occur in frame 0, or otherwise in the first valid frame following frame 0. In a roaming capable system, the LID together with the Zone, Country Code and Traffic Splitting Flags occupy the second and third block information words in frame 0. The fourth block information word carries the three available time and calendar information words and are sent in the fourth block information word position in frame 0 in a rotating sequence one block information word at a time over 3 consecutive cycles. This allows the block information words in 001, 010 and 101 to be updated 5 times each hour.

An advantage of this scheme is that these messages are delivered without addresses. System information is used to attach a vector and message to it.

Bits A3–A0 define the type of message and a class of receiver for which it is intended, as shown in the table below. As an example, all receivers should look at this message, receivers which are using SSID frequency information should only look at this message, and/or only receivers which are using network identifier information (NID) (to be described hereinafter) to lock to this channel should look at this message. Also instructions on which frequency to go to when a Traffic Splitting Flag is changed, and time zone information can be sent.

| A3 | A2 | A1 | A0 | |
|---|---|---|---|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| . | | | | |
| . | | | | |
| 1 | 1 | 1 | 1 | Reserved for future use |

When a system message is indicated, an additional vector is added to the end of the vector field. A receiver decodes block information 4 and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver of there is going to be a traffic change and the traffic change information is a new frequency XXXXXX. The receiver adds this new frequency to its scan list. The receiver should move to XXXXXX frequency and look for an assigned SSID or NID on this other frequency. In a later transmission, which could be one month later or it could be 1 minute later, the Traffic Splitting Flag is unset on one frequency and set on the other redundant coverage area system. The receiver detects that roaming traffic is no longer supported on this channel and moves to the frequency it was instructed to go to by the message. Once there, the receiver determines if the SSID or NID and Traffic Splitting Flag is set correctly. When the SSID or NID information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NID match.

Another way to handle traffic splitting is for the system to unset the Traffic Splitting Flag and let the receiver find a new system transmitting that receiver's SSID or NID.

It should be understood from the foregoing that the same LID and Zone values may be used by the same provider or other providers on other channels.

Stored in each receiver is a list called a scan list, which contains at least one SSID. In each Zone, an SSID is transmitted in a predetermined number of frames, as will be explained hereinafter in conjunction with FIG. 13.

Figure 8:
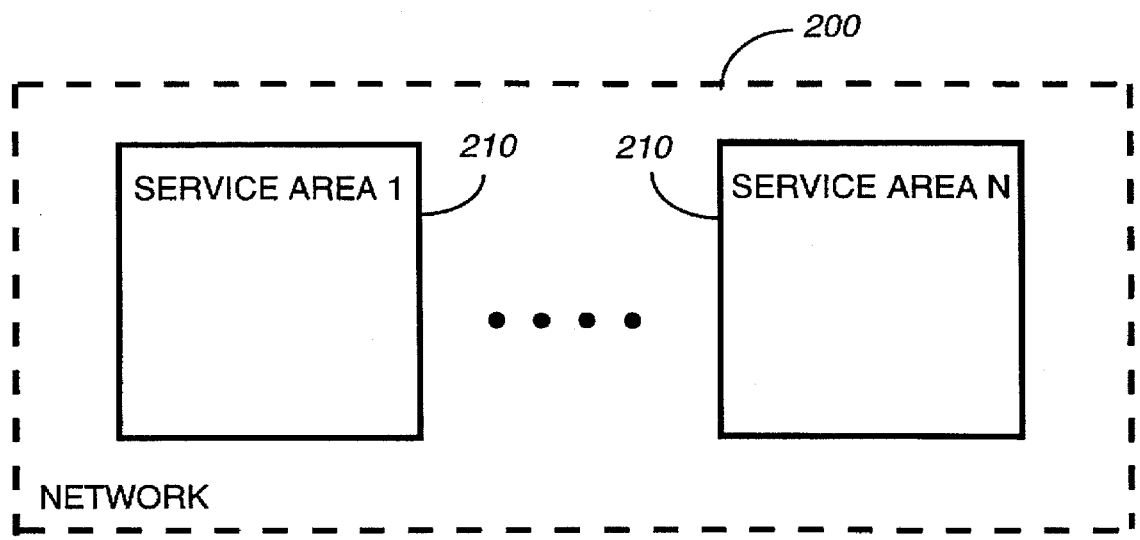
FIG. 8 illustrates a network and service area divisions according to the present invention.

Turning now to FIG. 8, in the case where a receiver desires coverage over a larger region, or to receive messages on multiple frequencies, which would otherwise be defined by multiple SSID's, a single piece of identification information is used, rather than multiple NID's. This is called network identification information (NID). A "Network" 200 is defined as a collection of many Service Areas 210 and a Service Area 210 is a coverage area which would otherwise be defined by a plurality of SSID's. An NID consists of a network address, a Service Area (SA), Traffic Splitting Flags, and a 3-bit NID multiplier to expand the number of unique Networks.

A Network may be formed by an agreement between several otherwise separate service providers, or may be a single large service provider. In a Network, there is a plurality of Service Areas, and in the example described herein, there are 32 possible Service Areas within a Network, identified by a 5 bit pattern, but a Network may be defined to consist of many more or less Service Areas.

Figure 9:
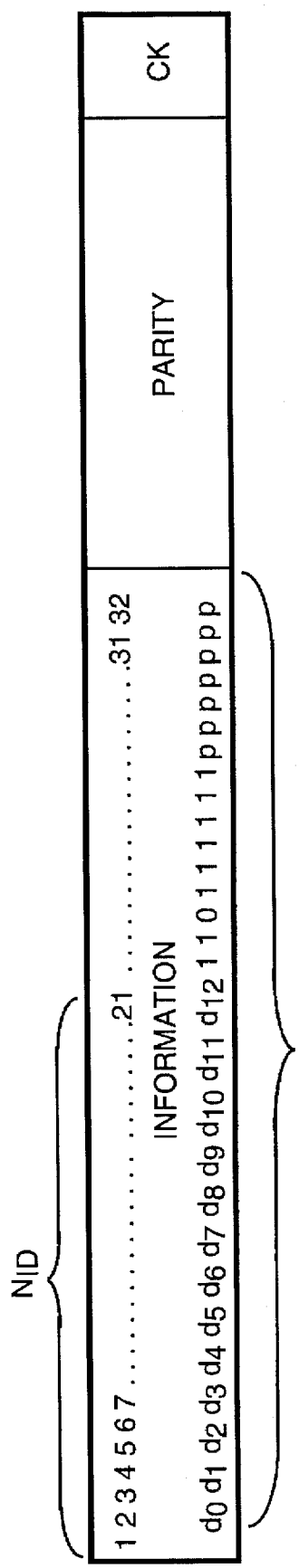
FIGS. 9 and 10 illustrate structures of an address word and a vector word, respectively, in which identification information is coded in accordance with the present invention.
Figure 10:
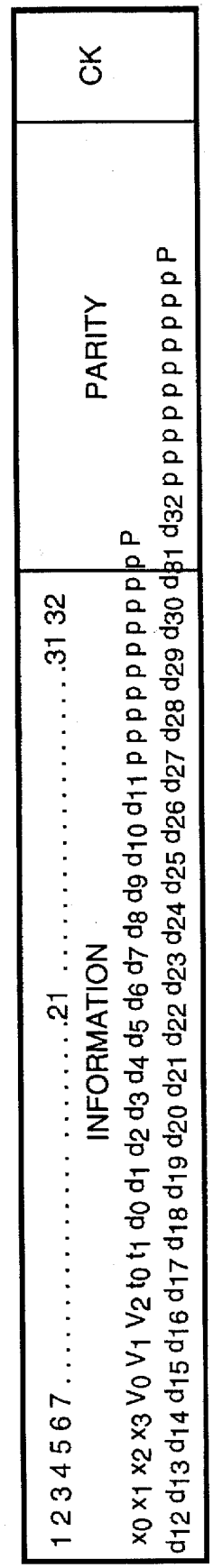

FIGS. 9 and 10 illustrate the manner in which the NID is encoded in the signal transmitted in each Service Zone. FIG. 10 illustrates a conventional 32–21 binary coded hexadecimal (BCH) address word, which is well known in the art. The first, 21 bits, d0–d20 of this word are used to define an NID, 12 bits of which are used to uniquely identify 4096 network addresses, as an example.

FIG. 10 illustrates the vector word structure associated with the address word of FIG. 9. The table below gives the bit definitions associated with the vector word of FIG. 10.

| $t_1 t_0 \; d_{11} d_{10} d_9 d_8 d_7 d_6 d_5 d_4 d_3 d_2 d_1 d_0$ | |
|---|---|
| 00  $c_3 c_2 c_1 c_0 b_3 b_2 b_1 b_0 a_3 a_2 a_1 a_0$ | -3 Numeric Characters with Short Address or 8 Numeric Characters with Long Add. or 12 bits usable for Roaming Networks |
| a11a10a9 ... a0 | |
| 01  $s_8 s_7 s_6 s_5 s_4 s_3 s_2 s_1 s_0 S_1 S_1 S_0$ - | 8 Sources plus 9 or 30 Unused Bits |
| 10  $s_1 s_0 R_0 N_5 N_4 N_3 N_2 N_1 N_0 S_2 S_1 S_0$ | 8 Sources, 0–63 Message Number, Message Retrieval Flag, and 2 or 23 Unused bits |
| 11 | Spare Message Type |

Bits V0V1V2 are used to specify the vector type, such as numeric, tone-only, etc. When the V0V1V2 are set to a value corresponding to a particular type, such as short message/tone only, this signifies that the 12 bits d0–d11 specify a Service Area, Traffic Splitting Flags and Network multiplier. For example, a0–a4 define the Service Area (32 possible) a5–a8 are the Traffic Splitting Flags and a9–a11 are Network multiplier bits. The Network multiplier bits allow for 8 times 4096 more unique NID's.

In certain circumstances when the network address has a system message attached thereto, the 12 bits defining the additional NID information residing in the message field and the vector would otherwise operates as a vector pointing to the system message in the message field, where the 12 previously described bits also reside.

In each Service Area, the transmitted signal includes the identifier associated with that Service Area. The placement structure of the various parts of the identifier in the signaling protocol is shown in FIGS. 12 and 13. In a receiver which is roaming in a Network, a frequency scan list is stored which includes a list of frequencies for which there is a high probability that an identifier match will be obtained. The placement structure of FIG. 13 provides for a way to predict where the identifier information can be found. In any event, when a match cannot be found from the stored scan list, then the receiver searches its entire synthesizer bandwidth. Once the receiver locks onto frame 0 on a particular frequency, a candidate frequency is qualified or disqualified quickly.

FIG. 11 illustrates the placement structure of the SSID information in a four phase (time division multiplexed) expansion of the frame structure shown in FIG. 1. When a single phase system is used, then all of information in phases A, B, C and D collapse into the phase A. When a two phase system is used, then phases A and B collapse together to form one phase and phases C and D collapse together to form another phase.

As is well known in the art, a time division multiplexed system with multiple phases A, B, C and D provides certain traffic handling advantages for a service provider. A receiver capable of decoding information from only a single phase is assigned to a particular phase by the service provider at the time service is initiated. Some receivers are capable of decoding information from one phase at a time, but can switch to a different phase. In this case, a service provider can initially assign a receiver to a particular phase, but can use the system messages described above to inform the receiver from time to time that messages will be transmitted on a different phase. Finally, some receivers are capable of decoding multiple phases and can therefore, as shown by FIG. 11, lock onto an assigned frame quicker than a single phase receiver.

In order to provide roaming service, all channels (frequencies) in a system which are roaming-capable are required to transmit fully a predetermined number of frames. For example, it is required that all roaming channels transmit frames 0 through frame 15 with frame 0 aligned to the four minute time mark. It is established, in this example, that frames 0–15 must be present and that these frames contain the LID words LID1 and LID2 in the frames and phases as shown in FIG. 11.

Across the phases, LID1 and LID2 are offset by one frame so that a receiver assigned to a specific phase is able to determine its desired SSID presence in the least amount of search time on each channel, and to balance or distribute information overhead among the phases.

The placement structure shown in FIG. 11 provides a known time position to allow for quick processing of candidate frequencies when a receiver is roaming. If the roaming decision can be made on the basis of LID's only, then 16 channels can be processed every four minutes. Since frames 0–15 must be present, a fast scan over a large bandwidth is made possible using symbol rate detection to identify roaming capable channels. LID2 is transmitted only in each phase once per cycle and LID1 is transmitted every four frames, once in each phase (in at least frames 0–15).

On all frequencies (channels) which are roaming capable, only frames 16–127 may be shared with other service providers or replaced with an alternate protocol. When a frame is transmitted, it must contain a predetermined SSID pattern, such as, for example, the LID following the pattern established in frames 0–15.

"T" refers to the optional presence of three block information words sent out in frame 0 on a rotating basis to indicate time and calendar information, as described above. The "T" type block information words are sent out in all 4, 2 or 1 phases depending on the system operating speed. It takes 3 cycles to completely refresh a receiver with a complete set of time and calendar information (5 updates each hour). The time/calendar instructions are optional, but when carried by the system, are required to follow the rotating pattern of one selection in every cycle. This format provides a known time/calendar position to permit a receiver to quickly process the candidate frequencies when roaming. The rotational sequence is changeable so that a "T" block information word format 101 is used to send a roaming system message when needed.

FIG. 12 illustrates a first placement configuration for NID information, identified N1–N10. Like the LID's, the SSID information, NID information is required to appear once during frames 0–15. Thereafter, the pattern optionally continues in those additional frames available. When a service provider chooses to continue the NID placement sequence past frame 15, the sequence must include all NID's active on the channel. The pattern shifts positions across phases and frames every four minutes (1 cycle) allowing a single phase pager which is synchronously decoding a channel to eventually see the NID in its assigned frame. The detection of an NID twice indicates that all NID's have been examined.

The placement of 10 NID's N1–N10 are shown in FIG. 12 as an example. The NID's are placed sequentially through the phases in an offset fashion, similar to the SSID placement structure of FIG. 11. When a single phase is transmitted, then all of the information collapses into a single phase such that a different NID appears in each of frame 0 through frame 9. This structure is precessed such that the sequence is offset by at least one frame in the next cycle to avoiding shadowing problems.

Turning to FIG. 13, a second placement sequence for NID information will be described. In this sequence, all NID's supported on a channel are required to appear at least once during frames 0–15. However, according to this configuration, an expected or predicted position for an NID is determined by the following set of rules:

(a) Each frequency or channel is represented by a number in the range of 0–15. M=Modulo16 of Integer [Freq kHz/ Channel Spacing kHz]

(b) N=Modulo16 of NID (4 least significant bits);

(c) C=cycle number (0–15); and (d) Expected frame=F=Modulo16 of N+M+C.

According these rules, it is possible to search 16 consecutive frequencies for the same NID in the 30 second (16 frame) period at the beginning of each 4 minute period of time. It also causes the NID to shift one frame each cycle which alleviates possible "shadow" problems in the case of a receiver located where two systems have overlap. This placement sequence has a lower NID "overhead" for cases where the channel carries less than 16 NID's.

Figure 14:
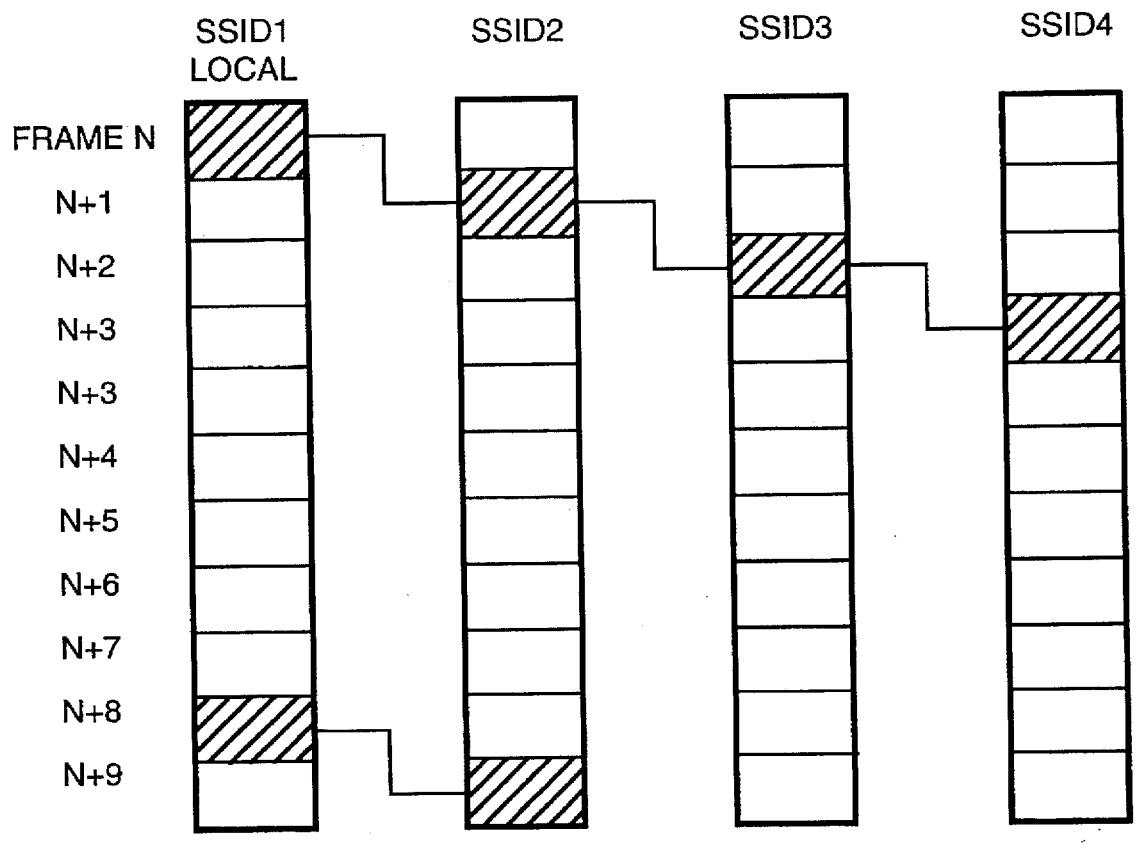
FIG. 14 is a diagram illustrating a scan sequence used by a receiver for channel identification during possible frequency overlap situations.

FIG. 14 illustrates a frame offset mechanism which enables a receiver to scan frequencies in every frame which are offset from its home frame as indicated. This frame offset method is useful in situations where a receiver is straddling an area where there is two or more possible matching frequencies in the same coverage area. In order that a match on any of the possible frequencies can be achieved, for each frequency of which coverage is desired, a frame is chosen in which the receiver can match SSID or NID information, which is different from the frames for the other frequencies. For example, as shown in FIG. 14, the frame chosen in each frequency is offset by one frame. Other frames could also be chosen. Consequently, the receiver is able to detect for all SSID's since each is assigned to a different frame in the cycle.

Figure 15:
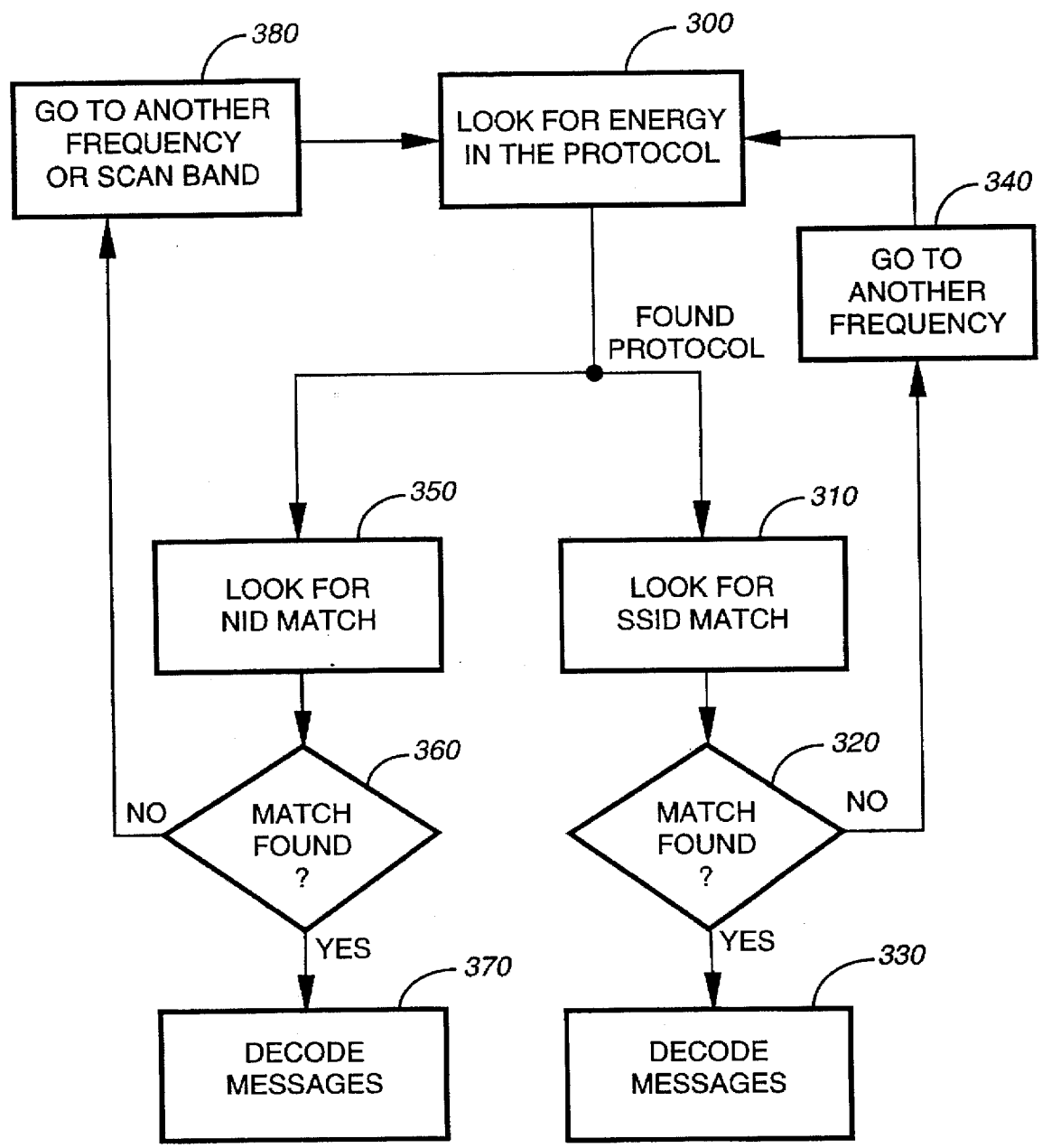
FIG. 15 is a flow chart generally illustrating how a receiver detects SSID and NID information.

Turning now to FIG. 15, a procedure by which a roaming receiver decodes a message will be described. From the outset, it should be understood that there are a variety of receivers capable of roaming in accordance with the present invention, including single frequency receivers and frequency synthesized receivers which can lock to any frequency in a predetermined bandwidth. Also, both of these receivers may be fixed phase, variable phase or multiple phase receivers.

Regardless of receiver type, when entering a new area in which a receiver has yet to lock onto a signal transmitted in accordance with an established protocol, it is likely that from the last message receiving session the receiver has an approximation of the occurrence of frame 0 at some frequency. The accuracy of this approximation is dependent on the crystal oscillator in the receiver.

In step 300, the receiver attempts to detect energy in the protocol on the last frequency on which it operated. When the receiver has an SSID subscription, the procedure follows on the right side of the flow chart. When the receiver has an Network coverage subscription, the procedure goes to the left side of the flow chart.

In step 310, once frame 0 of a cycle is found, the receiver can detect and compare the SSID information encoded in the transmitted signal with its stored SSID information. This process is performed according to the placement rules described in conjunction with FIG. 11. When a match is found as indicated in step 320, the receiver can locate its assigned frame to decode the message(s) addressed to it in step 330.

However, if the SSID in the transmitted signal does not match with the SSID stored in the receiver (accounting for the current frequency of the receiver), then in step 340, the receiver switches to another frequency, if it is capable of doing so. When the receiver is a single frequency receiver, then it cannot tune to another frequency and will enter a time-out mode and/or a message is optionally displayed on a display of the receiver indicating its inability to receive messages in that current location of the receiver.

When the receiver has only NID information stored in it, then from step 300, the procedure goes to step 350 and looks for an NID match, taking into account the NID placement rules of FIG. 12 or FIG. 13. When a match is found as indicated in step 360, the receiver locates its assigned frame and decodes its addressed messages in step 370.

However, in the event that a match is not found in step 360, in step 380 the receiver tunes to another frequency by referring to a recent list of frequencies where matches have been previously found. When no such list exists in the receiver, then the receiver begins scanning across its band to look for energy in the protocol and the process repeats from step 300.

When a single frequency receiver subscribes to Network coverage, then if a match is not found in step 350, a message is optionally displayed on the receiver that the user has gone outside a subscription area, the receiver is not functioning properly, or the service provider is not transmitting information on that frequency. A time out period is initiated and the process repeated some period of time later in an attempt to find an NID match.

Below an example of a scan list is shown. Generally, the first entry in the list is the last frequency and associated SSID or NID that the receiver locked to. Next, the SSID's are listed, and finally, the NID's are listed with an associated frequency. Thus, a receiver attempts to lock to the last frequency and associated SSID or NID on which it received messages, and then proceeds through the SSID information, and finally the NID information.

| FREQUENCY | SSID | NID |
|---|---|---|
| Frequency 1 | — | NID1 |
| Frequency 2 | SSID2 | |
| Frequency 5 | SSID3 | NID1 |
| Frequency 3 | — | NID1 |
| Frequency 4 | — | NID1 |
| Frequency N | SSIDN | NID1 |

Later on, a different scheme will be described where the receiver attempts to lock to frequency and associated SSID or NID having the highest priority.

Figure 16:
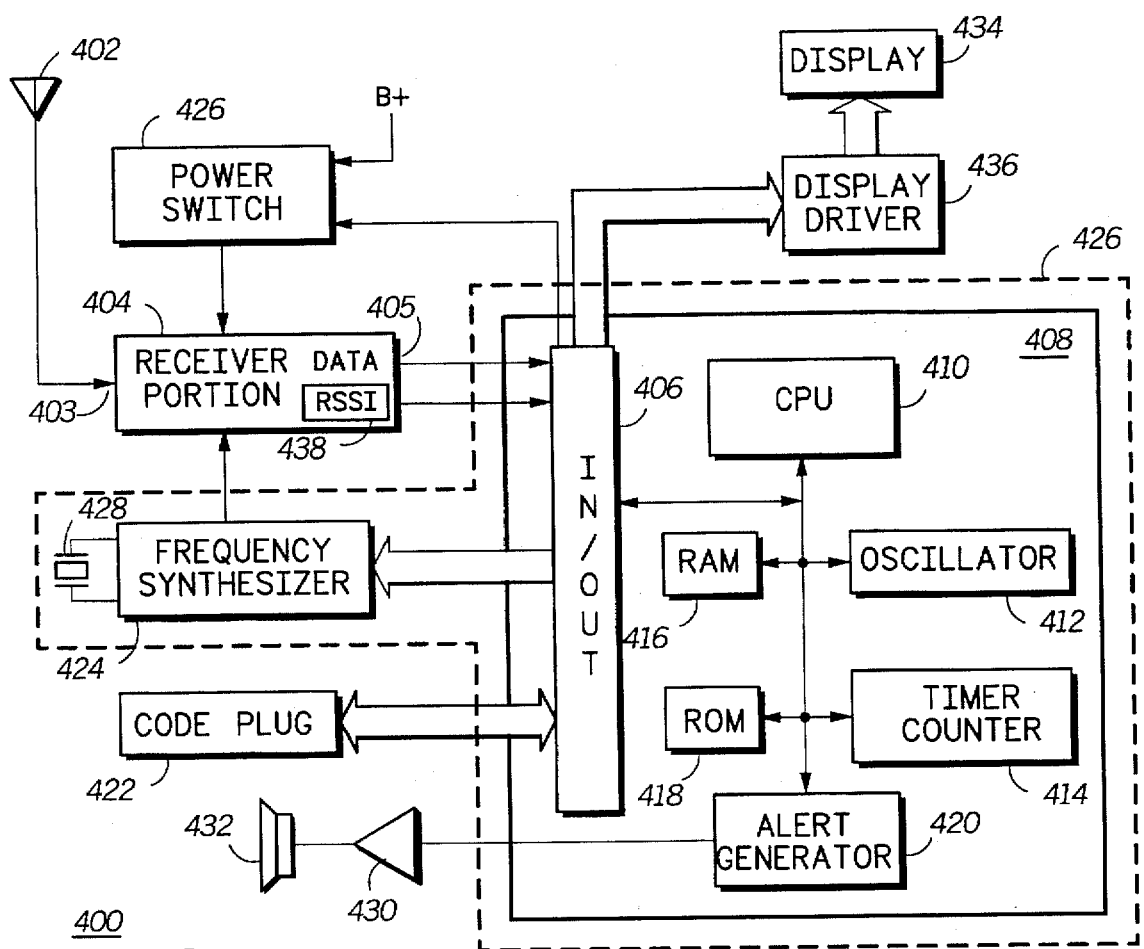
FIG. 16 is an electrical block diagram of a selective call receiver in accordance with the present invention.

FIG. 16 shows an exemplary electrical block diagram of a receiver 400, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSSI) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a CPU 410, oscillator 412, timer counter 414, random access memory (RAM) 416, read only memory (ROM) 418 and alert tone generator 420. CPU 410 controls the operation of receiver 400 and processes the received coded message signals. Oscillator 412 provides the clock for the operation of the CPU 410, and provides the reference clock for timer counter 414. The oscillator 414 is controlled by a crystal, not shown in the diagram. Assigned transmission slot and channel identification information and pager addresses are stored in code plug 422, which is a programmable read only memory, such as an electrically erasable programmable read only memory (EPROM). In addition, the SSID information and NID information as well as any associated priority information (later described) is also stored in the code plug 422. The RAM 416 is used to store code plug information when the receiver 400 is initially turned on, and to store messages as they are received. ROM 418 contains the firmware which controls the microcomputer operation. The firmware includes such programs as for controlling the decoding of transmission slot identify information, channel identification information, receiver address, receiver scanning frequency lists, NID information, SSID information, and other receiver functions. Alert generator 420 generates an audible alert signal upon reception of a message.

When the receiver 400 is initially turned on, microcomputer 408 functions as a synchronization means, enabling the receiver 400 to synchronize the assigned transmission slot, after the receiver detects information in frame 0 and synchronizes to the transmitted signal. Microcomputer 408 also functions as the decoder for decoding channel identification information, LID information, NID information and pager address information. Microcomputer 408, in conjunction with frequency synthesizer 424, functions as a channel selecting means 426 used to control the scanning of the receiver 400. Microcomputer 408, in conjunction with power switch 428, provides a battery saving function for the receiver 400.

Figure 17:
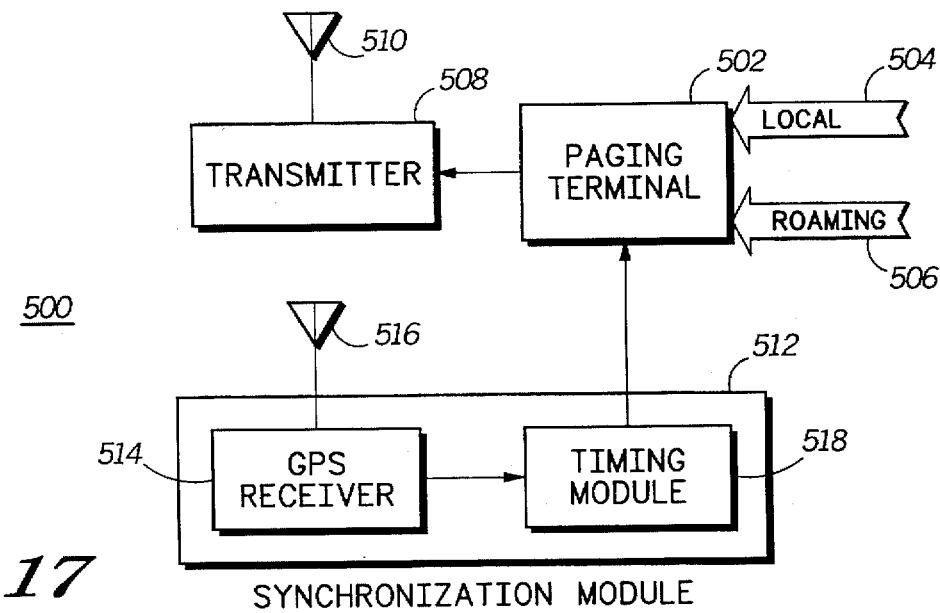
FIG. 17 is an electrical block diagram of a transmitter station in a paging system according to the present invention.

FIG. 17 illustrates an example of a transmitter station 500 useful in accordance with the present invention. Transmitter station 500 comprises a paging terminal 502 used to enter messages originated in a home or local area with respect to a receiver, as indicated at 504, or the messages are for receiver that is roaming outside its local area, as indicated at 506. Messages for a roaming receiver which are originated outside of the coverage area home or local area of a receiver are conveyed to the paging terminal 502 by a hardwire interconnect with a paging terminal in the home or local area, such as a dial-up or hardwired phone line, or by means of an RF signal, such as a satellite receiver.

Messages entered into paging terminal 502 are processed for transmission into the signaling format or protocol described above, and in the aforementioned patent, or another suitable signaling protocol. The messages are placed in queues corresponding to the frame to which a receiver is assigned. The output of the paging terminal is coupled to an RF transmitter 508 for transmission via an antenna 510. It is appreciated that the paging terminal 502 optionally controls more than one transmitter, as in a wide area simulcast system, and synchronization of multiple transmitters in a simulcast system is provided. Various methods for synchronizing the transmitters are available, such as described in U.S. Pat. No. 4,718,109 to Breeden et al.

Furthermore, in order to provide for global synchronization of transmitters to frame 0 as described above, a synchronization module 512 is coupled to the paging terminal 502. The synchronization module comprises a global position system (GPS) receiver 514 and a timing module 516, which together enable the paging terminal 502 to determine an accurate occurrence of frame 0. Instead of a GPS receiver 514, another time standard signal is monitored by suitable monitoring devices.

As described above, the FLEX protocol defines a subscriber device that is a multi-frequency capable. Such subscriber devices store a number of valid tokens (IDs) in a scan list in the device's internal memory that are used for frequency selection. The scan list may contain other attributes that can be used in the validation of frequencies. The device chooses to monitor a channel (freq) because a token ID displayed on that channel matches a token stored in the scan list. For FLEX, the token can be an NID (Network ID) or an SSID (Simulcast System ID).

A subscriber device acquires the channel by scanning active FLEX channels and making a decision to monitor the channel(s) which carries an ID that matches an ID stored in the scan list. When two or more channels are found to carry matching IDs, the subscriber device chooses to monitor one or more of the channels based on an algorithm within the subscriber device.

Presently, existing protocols specify that the home input terminal sends the subscriber device's IDs to the output controller terminal with each message transmission. The output controller terminal compares the list of IDs received with those on the channels controlled by the output controller terminal. The output controller terminal sends the message transmission on all of those channels which carry an ID from the intersection of the comparison. This method leads to RF channel inefficiency when an output controller terminal has multiple channels carrying an ID which matches those known to the subscriber device, while the subscriber device may be locked to only one of the channels.

Figure 18:
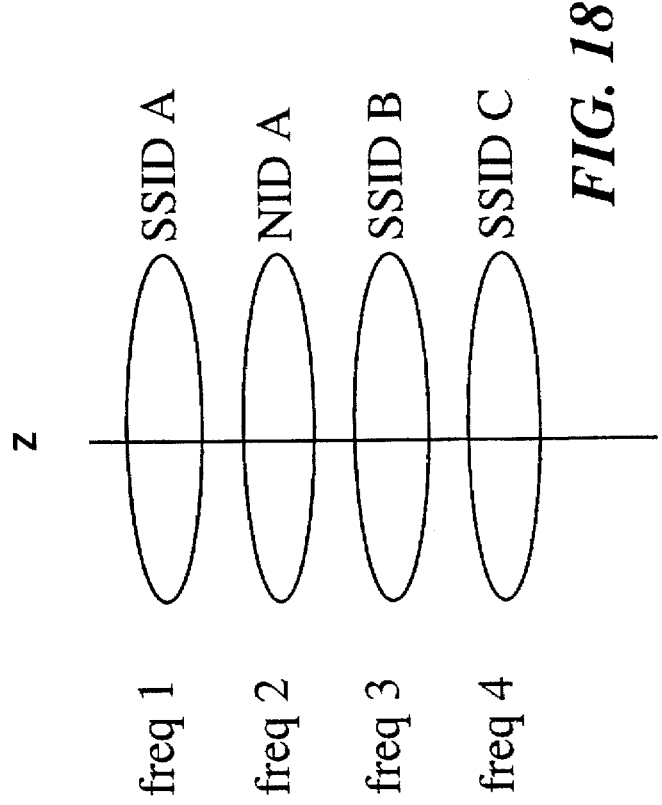
FIG. 18 is an illustration of identifiers assigned to a particular frequency having the same coverage area in accordance with the present invention.
Figure 19:
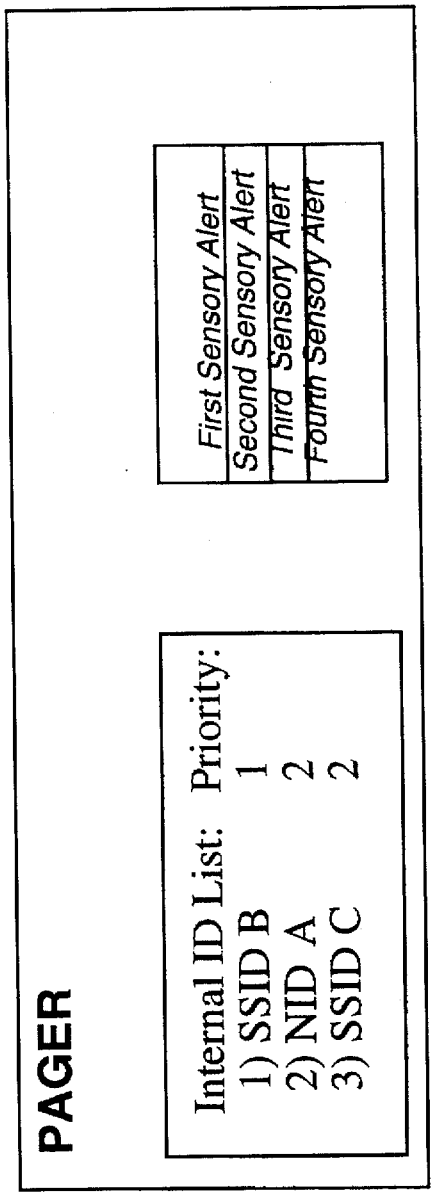
FIG. 19 is a identifier/priority list that is located within a pager in accordance with the present invention.

Assume that an output controller controls the frequencies in coverage area Z (FIG. 18). Assume an input device (e.g. terminal) attempts to send a message to the subscriber device (FIG. 19) in coverage area Z. The current state of the art specifies that the input device sends the subscriber ID list along with the message and other attributes (message length, message type, etc.) to the output control device. The output control device would then be obligated to cause the message to be transmitted on three frequencies, namely frequency 3 (SSID B), frequency 1 (NID A), and frequency 4 (SSID C) to ensure that the message can be received by the subscriber device. This action causes the message to be transmitted on three frequencies although the subscriber device is monitoring only frequency 3 due to it's internal programming.

The present invention describes a method which allows the output control device to make an informed decision as to which channel the subscriber device is monitoring in the coverage area serviced by the output controller. The present invention preferably assigns a value or priority to each ID in the subscriber's database and preferably, the input device passes this information to the output controller terminal such that the controller can decide which of its multiple channels that carry a matching ID should be used to send the message transmission. These values are determined from the knowledge of the internal IDs stored in the subscriber device and how that subscriber device is programmed to behave in an environment when more than one of the IDs are found on channels in a region. These subscriber device behaviors may vary based on the subscriber device manufacturer or model. In the example in FIG. 19, the subscriber device will lock to the channel carrying SSID B if present. In the absence of SSID B, the subscriber device will monitor 2 channels if present and carrying NID A and SSID C (the priority values are equal for these two IDs).

The present invention is especially valuable when systems are set up such that an NID is used for a large coverage area composed of many smaller systems carrying SSIDs. If the subscriber device is programmed with an SSID for "home" operation and an NID for "roaming" operation, then the output controller will need to send the message only on the SSID channel in the home system while sending it on the NID channel on all other systems.

Through the use of this invention, an input device is able to send a single message request into a network with a one to many distribution (e.g. satellite), and each node (output controller terminal) in the network can choose the correct minimal channel or set of channels on which to send the message. Or, the home input terminal, knowing at least some information about the channels (identifiers and frequencies) available at the output controller terminal can choose the correct minimal channel list.

Prioritization of IDs can be also used in the scan list of the subscriber device. In that case, when a device finds multiple channels with matching IDs, it would monitor all channels that display the matching ID with the highest priority. The use of this refinement is orthogonal to the use of the prioritized lists mentioned above. In many cases, the prioritized ID list of the subscriber device can be sent, without modification, to the output nodes.

Figure 20:
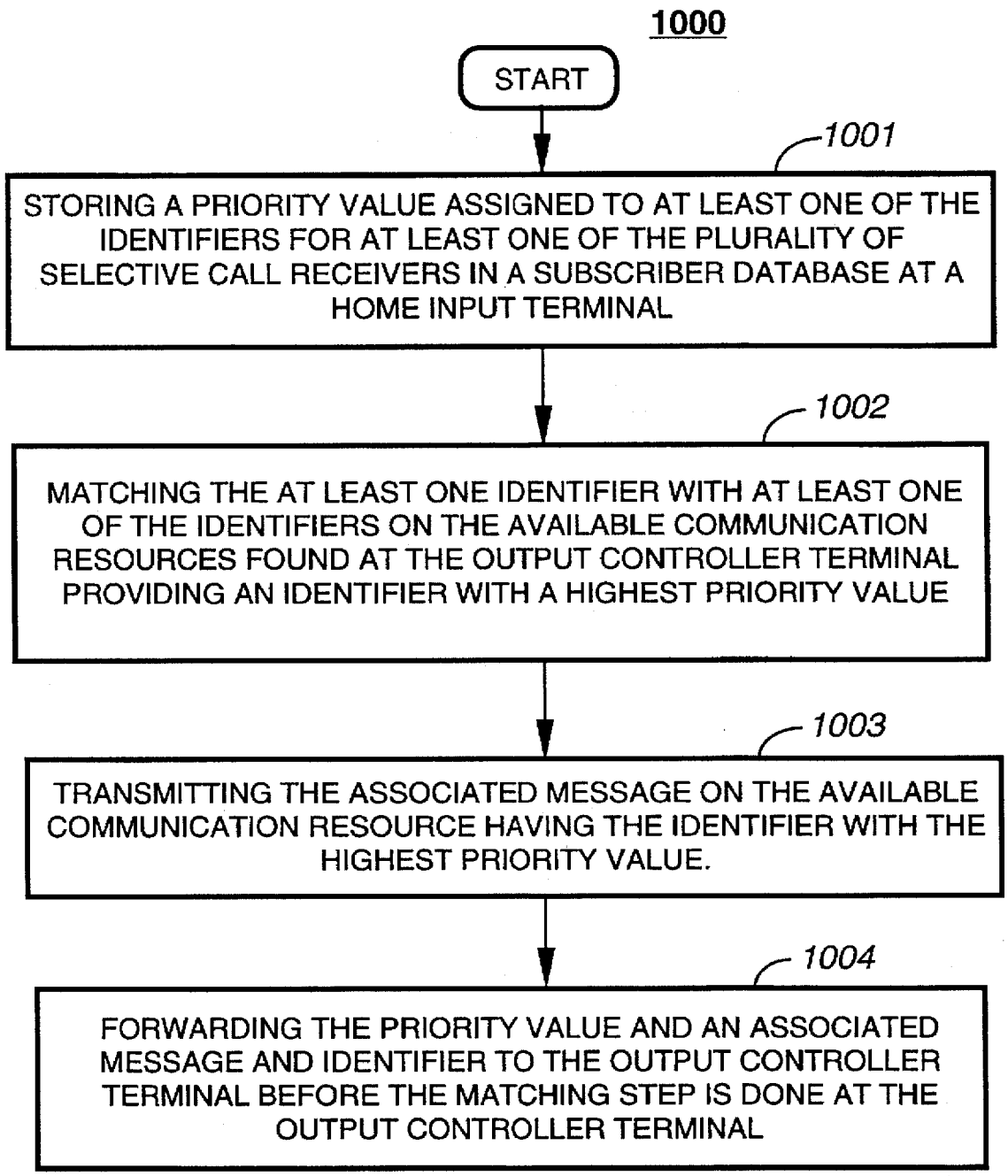
FIG. 20 is a flow chart illustrating a method of transmitting messages on communication resources having identifiers with the highest priority in accordance with the present invention.

Now referring to FIG. 20, a method 1000 for efficient multi-frequency roaming and messaging for a plurality of selective call receivers in a selective call messaging system using identifiers on various communication resources recognized by at least one of the plurality of selective call receivers is shown. The method 1000 comprises a step 1001 of storing a priority value assigned to at least one of the identifiers for at least one of the plurality of selective call receivers in a subscriber database at a home input terminal and a step 1002 of matching the at least one identifier with at least one of the identifiers on the available communication resources found at the output controller terminal providing an identifier with a highest priority value. Step 1002 can be done at the home input terminal before the priority value and associated message and identifier are subsequently forwarded to the output controller terminal. In the broadest application, then at step 1003, the associated message is transmitted on the available communication resource having the identifier with the highest priority value. It should be also be understood that a communication resource can comprise any combination of frequency, phases, time slots, traffic message flags (TMF's) and even codes in a CDMA type of system. The method may further comprise the step 1004 of forwarding the priority value identifier, and associated message to the output controller terminal before the matching step is done at the output controller terminal. The identifier described above are preferably either a network roaming identifier (NID) associated with network wide frequencies or a simulcast system identifier (SSID) associated with local system frequencies.

Figure 21:
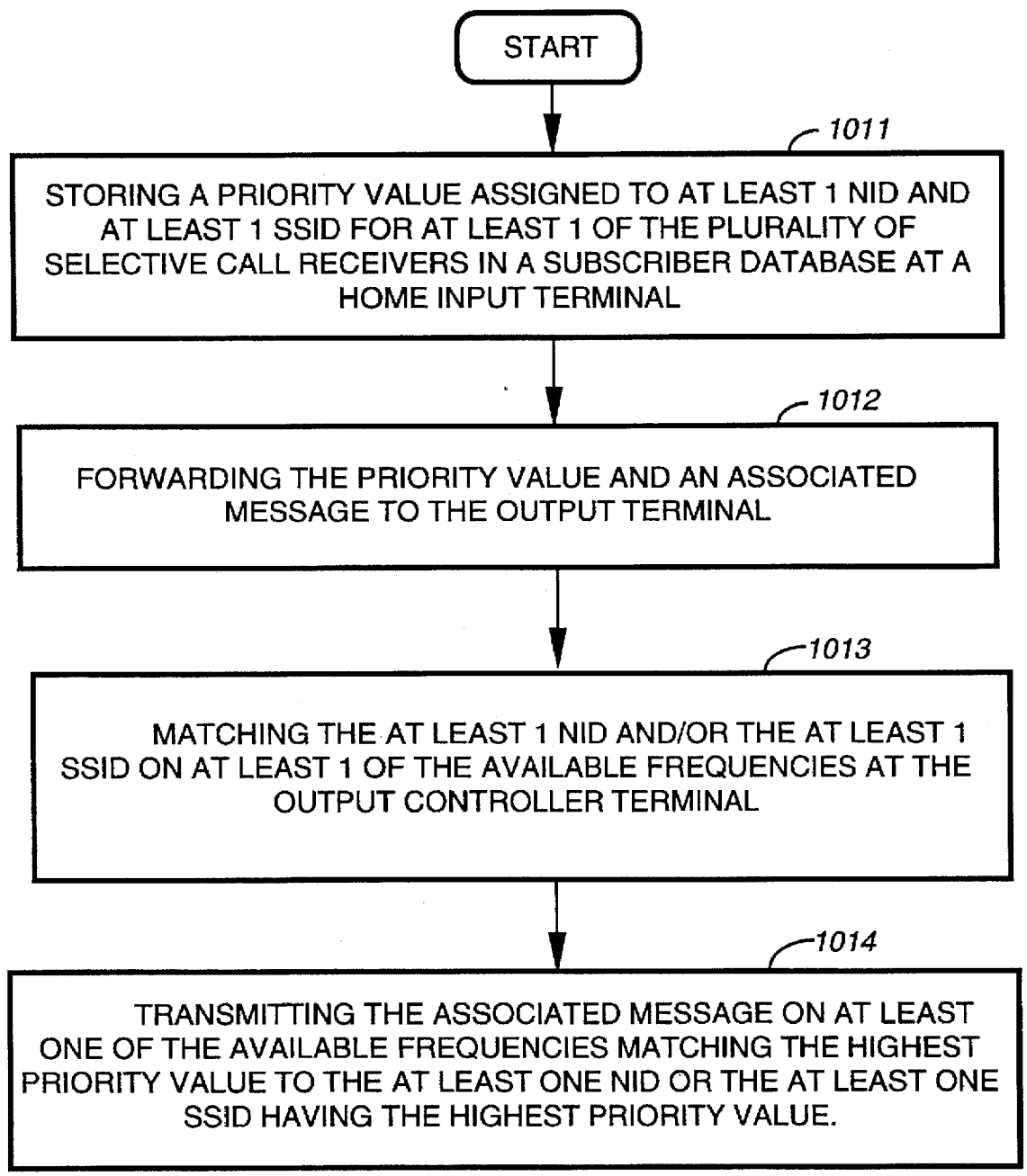
FIG. 21 is another flow chart illustrating a method of transmitting messages on communication resources having identifiers with the highest priority in accordance with the present invention.

Referring to FIG. 21, another method 1010 for efficient multi-frequency roaming and messaging for a plurality of selective call receivers in a selective call messaging system using network roaming identifiers (NIDs) associated with network wide frequencies and simulcast system identifiers (SSIDs) associated with local system frequencies is shown. The method 1010 comprises the step 1011 of storing a priority value assigned to at least one NID and at least one SSID for at least one of the plurality of selective call receivers in a subscriber database at a home input terminal and the step 1012 of forwarding the priority value and an associated message to the output terminal. The forwarding step could be done when the particular selective call receiver user notifies the home input terminal that the user will be within the region of a particular output controller terminal or when the particular selective call receiver user notifies the home input terminal that the user will be outside the region of the user's home input terminal. Then, at step 1013, at least one NID or the at least one SSID is matched on at least one of the available frequencies at the output controller terminal. Finally, at step 1014 the associated message is transmitted on at least one of the available frequencies matching the highest priority value to the at least one NID or the at least one SSID having the highest priority value. Preferably, at step 1014, the associated messages are transmitted on more than one frequency if the priority values among the at least one NID or the at least one SSID are equal.

Figure 22:
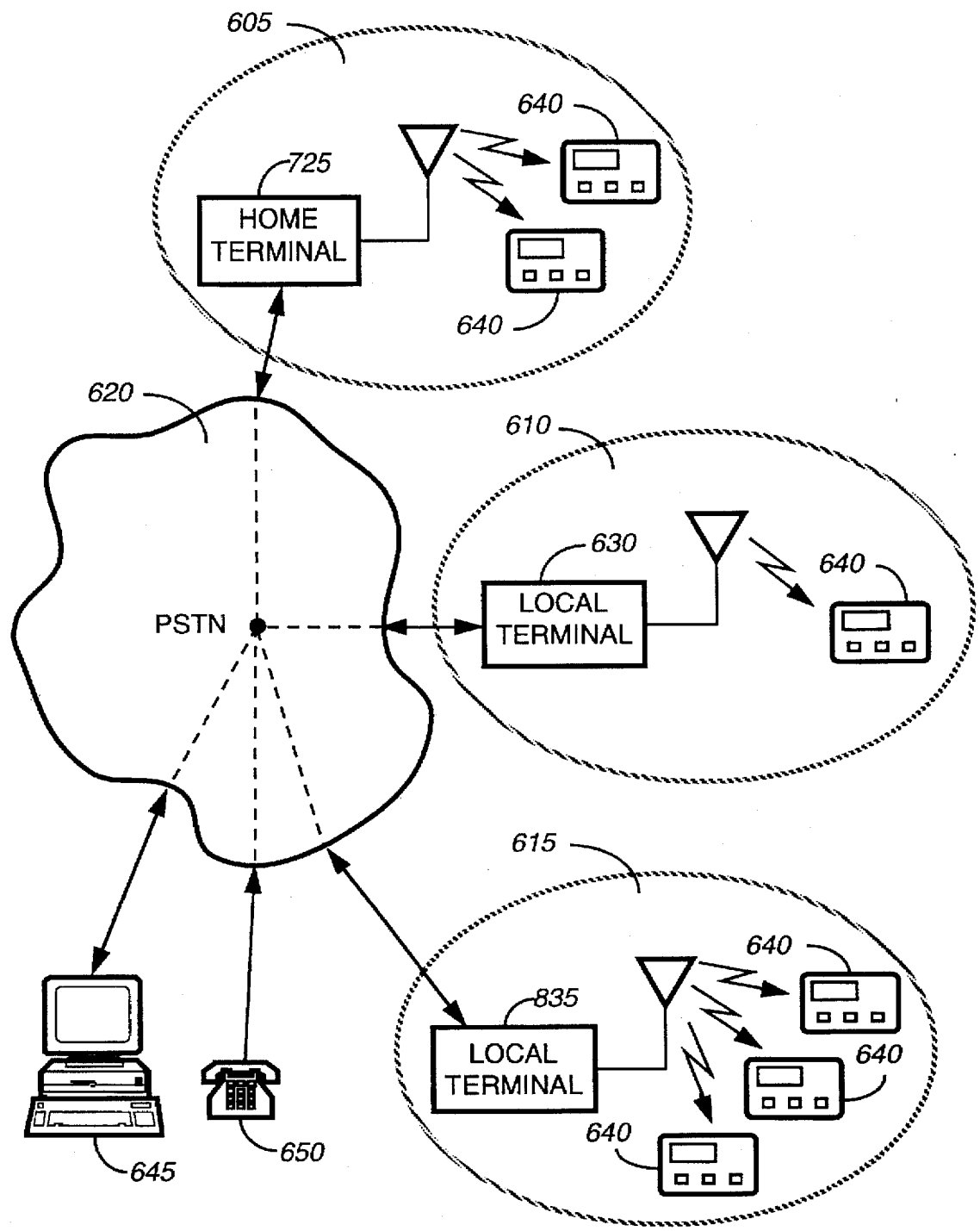
FIG. 22 is a system block diagram in accordance with the present invention.

Referring to FIG. 22, an efficient multi-frequency roaming and selective call messaging system 600 using at least one identifier on various communication resources is shown. The identifier is stored and recognized by at least one of a plurality of selective call receivers used within the selective call messaging system and are preferably either network roaming identifiers (NIDs) associated with network wide frequencies or simulcast system identifiers (SSIDs) associated with local system frequencies. The system preferably comprises a home input terminal 725 for storing a priority value assigned to at least one identifier for at least one of the plurality of selective call receivers in a memory, preferably a subscriber database. The system further comprises an output controller terminal networked to the home input terminal for assigning communication resources, wherein the home input terminal matches the at least one identifier with the highest priority value with a known identifier on an available communication resource at the output controller terminal (635 or 835) and then the home input terminal forwards the matched identifier and an associated message to the output controller terminal. Additionally, the system may include a transmitter for transmitting the associated message on at least one of the available frequencies matching the highest priority value to the at least one NID or the at least one SSID having the highest priority value.

The selective call messaging system or communication system 600 of FIG. 22 preferably comprises a plurality of communication sub-systems 605, 610, 615 operated by service providers for providing messaging service within predetermined geographic regions, which are represented by dashed lines. Each sub-system 605, 610, 615 comprises at least one terminal 725, 630, 835 for transmitting messages to portable communication devices, such as pagers 640, which receive and present the messages to system subscribers. Pagers 640 usually receive messages within a specified geographic area. However, according to the present invention, a pager 640 can "roam" into other regions and still receive messages. For example, a pager 640 that subscribes to a service provider in a first sub-system 605 normally receives messages transmitted by the terminal 725, which is referred to as a "home" terminal or home input terminal, in a first geographic area. When a pager subscribing to service in the first sub-system 605 roams into a second sub-system 615, messages intended for the roaming pager 640, i.e., the roamer, are temporarily transmitted by the terminal 835, which is referred to as a "local" terminal, in a second geographic area.

Preferably, the sub-systems 605, 610, 615 can communicate through a communication link. By way of example, the terminals 725, 630, 835 can be coupled by a telephone network such as the Public Switched Telephone Network (PSTN) 620. Messages are originated by a calling party who enters message information into the communication system 600 by contacting one of the terminals 725, 630, or 835 associated with a recipient pager 640. For instance, a calling party can provide message information and pager identification information, such as a pager address, to a terminal 725, 630, or 835 via a conventional telephone 650 coupled to the PSTN 620. A message comprising message information and pager identification information can alternatively be provided through use of other input devices, such as a personal computer 645 coupled to the PSTN 620 by a modem (not shown).

Although only three sub-systems 605, 610, 615 are depicted, it will be appreciated that any number of sub-systems 605, 610, 615 associated with different service providers can be included in the communication system 600. Furthermore, the sub-systems 605, 610, 615 need not be geographically near to one another. For example, the first sub-system 605 could provide service within Miami, while the second sub-system 610 could provide service within Tokyo.

Figures 23, 24:
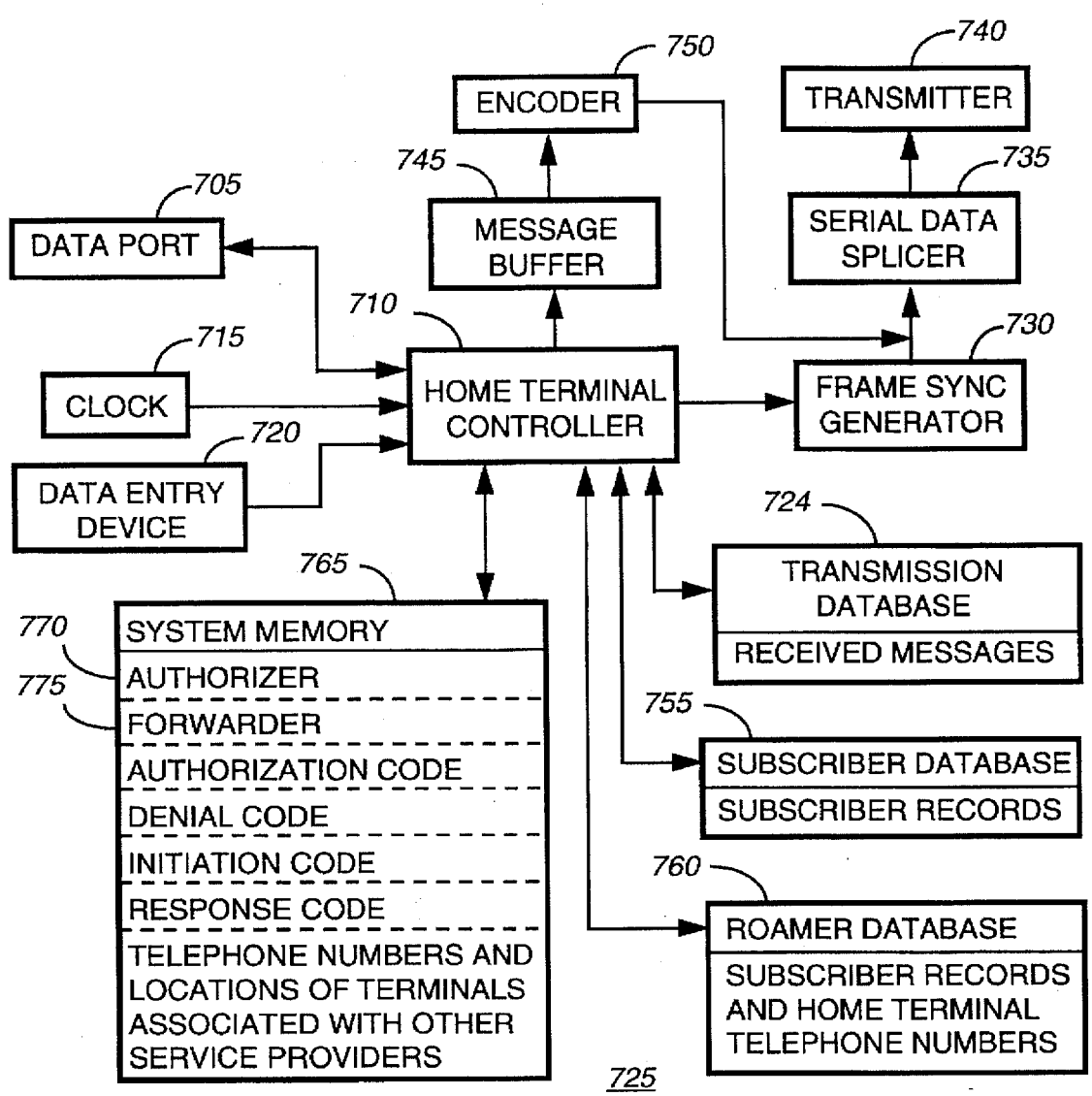
FIG. 23 is a home input terminal in accordance with the present invention.
FIG. 24 is a subscriber list in accordance with the present invention.

FIG. 23 is an electrical block diagram of the home terminal 725 for normally transmitting messages to a pager 640 within the communication sub-system 605 (FIG. 22). The home terminal 725 preferably comprises a data port 705 for receiving information, including messages. It will be appreciated that other means of receiving information, such as modems, direct links with other devices, or radio receivers, could also be used to receive information from outside the terminal 725. The data port 705 is coupled to a controller 710 for processing information, and a transmission database 724 is coupled to the controller 710 for storing messages for transmission to pagers 640.

The terminal 725 further includes a clock 715 for providing time values to the controller 710 and a memory location such as a subscriber database 755 for storing information about system subscribers in the form of "subscriber records" preferably including information about identifiers and their associated priorities. A data entry device 720 is coupled to the controller 710 for updating the subscriber records. A roamer database 760 coupled to the controller 710 stores records (including identifiers and priorities) for pagers 640 that have roamed into the sub-system 605 and telephone numbers for the home terminals associated with the roamers.

Further included in the terminal 725 is a system memory 765 for storing codes, values, and firmware used in operating the terminal 725. Preferably, the system memory 765 stores telephone numbers and locations of terminals 630, 835 that transmit in other sub-systems 610, 615 of the communication system 600. It will be appreciated that telephone numbers are described for use in contacting other terminals when the terminals are coupled by the PSTN 620. Other terminal identification information could alternatively be stored and utilized when the terminals are coupled by different types of communication links. For example, when the terminals are hardwired together, identification information other than telephone numbers may be appropriate.

Preferably, the system memory 765 further stores authorization and denial codes for authorizing or denying continued service for roaming pagers 640 and initiation and response codes used in forwarding information to other terminals, as will be explained in greater detail below. An authorizer 770 uses the authorization and denial codes to authorize or deny service based upon billing information stored in the subscriber record for a roaming pager 640, and a forwarder 775 forwards subscriber records for roamers according to the present invention. The authorizer 770 and the forwarder 775 can be implemented as firmware stored in the system memory 765 or, alternatively, as hardware capable of performing equivalent operations.

Messages are preferably transmitted by the terminal 725 using the conventional FLEX™ signaling protocol, according to which a radio signal is divided into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame. These eighty-eight words are usually divided into an address field, which includes the address of the pagers 640 to which messages are being transmitted, a vector field following the address field, and a message field in which message information is located. Some addresses, such as those referring numeric or alphanumeric message information, refer to a vector contained in the vector field, which specifies an area within the message field wherein corresponding message information is located.

The controller 710 gathers information to be transmitted during each frame into address, vector, and message fields according to the FLEX™ protocol. The information is then coupled to a message buffer 745 for temporarily storing the information until a time for further processing and transmission. Frames are transmitted in numeric sequence, so that while a current frame is being transmitted, information for the next frame to be transmitted is in the message buffer 745, and information for the next frame thereafter is being gathered by the controller 710. At the appropriate time, the information stored in the message buffer 745 is transferred to the encoder 750 for encoding the information into a conventional signaling format such as FLEX™.

The controller 710 next enables a frame sync generator 730, which generates the predetermined sync pattern that is transmitted at the start of each frame transmission. The sync pattern is multiplexed with the encoded information by the serial data splicer 735, which generates a message stream. The message stream is transmitted by a transmitter 740 as a radio signal for reception by pagers 640 located in the geographic region in which service is provided by the sub-system 605. Of course, this "home" terminal 725 acts much like an output control terminal, but the messages could be forwarded if desired to one of the networked output control terminals via the data port 705 or other means know in the art.

Referring next to FIG. 24, an example of a subscriber record 780 that can be stored in the subscriber database 755 is depicted. The subscriber record 780 preferably includes pager identification information, which could be a subscriber identification number or an address. The subscriber record 780 further includes addresses associated with a pager 640, types of messages, e.g., numeric, voice, alphanumeric, and tone only, that can be received by the pager 640, and billing information associated with the pager 640. Additionally, a home frame assigned to the pager 640, collapse values, frequencies on which messages can be received, and offset values associated with each frequency are stored in the subscriber record 780. The subscriber record 780 preferably includes all information necessary for processing messages and providing messaging service for a particular pager including identifiers and priorities in accordance with the present invention.

According to the present invention, the home terminal 725 for a pager 640 normally provides messages to the pager 640 in accordance with the subscriber record for that pager 640. When the subscriber of that pager 640 desires to travel to another location and still receive messages, the subscriber calls the terminal 725 and enters information indicative of his travel location. This can be in the form of a city name, a selected service provider, identification information such as an area code or a country code, or any other information sufficient for identification of the sub-system, such as sub-system 615, into which the subscriber intends to roam.

Once the subscriber has relocated, people can contact, such as by telephoning, the local terminal 835 to send a message to the roaming pager 640. Upon determining that the pager 640 carried by the subscriber does not normally receive message from the local terminal 835, the local terminal 835 automatically transmits a record request, including at least pager identification information, to other terminals from which pagers can roam. The home terminal 725 for the pager 640 responds to the record request by automatically transmitting the entire subscriber record for the pager 640 to the local terminal 835. In this manner, the local terminal 835 can store the subscriber record and format the message appropriately for transmission to the roamer. Furthermore, messages thereafter received by the terminal 835 for transmission to the roamer can be advantageously processed without additional communication with the home terminal 725.

When the home terminal 725 receives a message for transmission to the roamer prior to transmission of the subscriber record to the local terminal 835, the home terminal 725 automatically contacts the local terminal 835 and forwards both the message and the subscriber record for the roamer to the local terminal 835 for storage thereby. The local terminal 835 can then conveniently transmit both the forwarded message and other received messages to the roamer without ever having to make a request for the subscriber record.

In conventional communication systems, on the other hand, the subscriber record for a pager is never forwarded in its entirety to sub-systems into which a pager has roamed. Instead, each time a local terminal, i.e., one associated with the region into which the pager has roamed, receives a message to be transmitted to the pager, the local terminal must contact the home terminal for message validation. Specifically, the local terminal transmits the message intended for the roamer back to the home terminal. The home terminal then refers to the subscriber record for the roamer and formats the message appropriately. Thereafter, the home terminal returns the formatted message to the local terminal. Additionally, the home terminal provides the local terminal with additional information necessary for transmitting the message.

In some conventional systems, the home terminal "knows" the transmission characteristics, such as transmission frequencies, of other sub-systems into which a pager can roam. In other words, a relatively large amount of memory is required within the home terminal to store transmission characteristics for other sub-systems. Because the frequencies at which each local terminal transmits are stored by the home terminal, the home terminal needs to transmit the roamer frequency offset values for only the frequencies utilized by the local terminal. However, other information, such as the home frame, address, and collapse value, must be transmitted as well. It can be seen that transmission of a single message to a roamer requires message validation plus the provision of a relatively large amount of information to the local terminal before the message can ever be transmitted. This time-consuming process can result in message delays that can be critical to roaming subscribers in some instances, such as when the subscriber is a doctor or a police officer. Furthermore, this process must be repeated each and every time the local terminal is to transmit a message to the roamer, resulting in inefficient use of the system that can lead to backlogs and further system delays.

In some other conventional systems, the large amount of memory required for storage of transmission characteristics for every other local terminal is not available. In such a system, upon receiving a message validation request, the home terminal still formats the message, returns the message, and transmits additional information to the local requesting terminal. However, because the transmission characteristics of the requesting terminal are unknown, the home terminal must provide all of the frequency offset values and associated frequencies as well as the home frame, the collapse value, and the address to the local terminal. Although this conventional method saves memory space in the home terminal, it results in even greater inefficiencies since a much greater amount of information must be provided to the local terminal each time a message is to be transmitted to the roamer.

An advantage of system 600 according to the present invention is that roamer information, in the form of subscriber records, is efficiently provided to requesting terminals because a subscriber record is only transmitted once to a local terminal 835 providing service in an area into which a pager 640 has roamed. Thereafter, the local terminal 835 processes further messages for the roamer without having to communicate with the home terminal 725. A subscriber of the roaming pager 640 therefore receives messages in a timely fashion, and delays resulting from excess communications between terminals 725, 835 are not introduced into the system 600. Furthermore, the home terminal 725 does not have to waste memory space by storing transmission characteristics for other terminals 630, 835.

A further advantage of the system 600 according to the present invention is that billing information can be conveniently processed by the local terminal 835 since the entire subscriber record has been forwarded by the home terminal 725. The billing information can simply be periodically updated by the local terminal 835 and, during off-peak hours, transmitted to the home terminal 725. After evaluation of the subscriber billing status, the home terminal 725 can authorize or deny continued paging service for the roamer.

Figure 25:
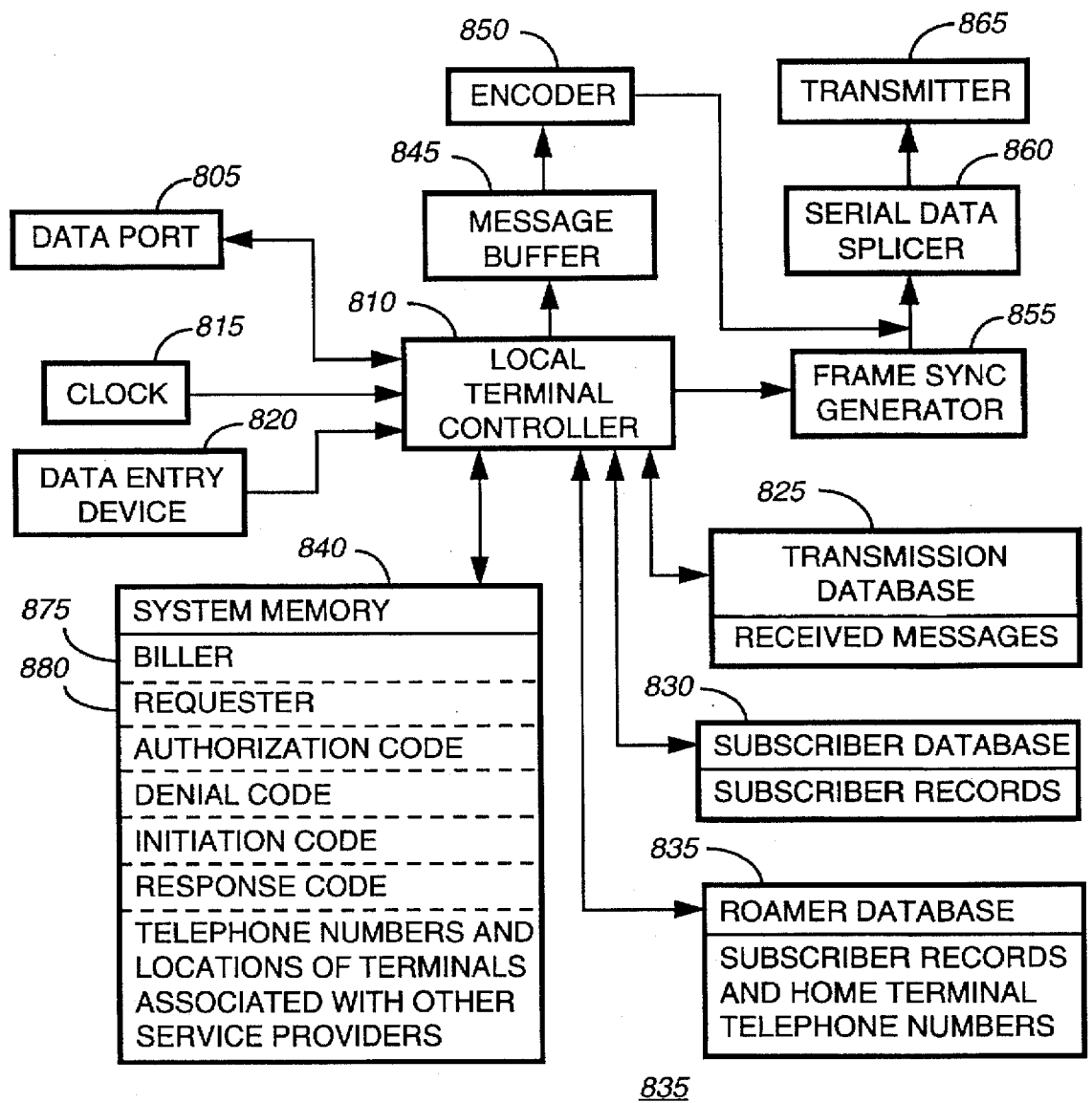
FIG. 25 is an output controller terminal in accordance with the present invention.

Referring next to FIG. 25, an electrical block diagram of a local terminal, such as the local terminal 835, is depicted. The local terminal 835 preferably comprises a data port 805 or other device, such as a modem, for receiving information. A controller 810 coupled to the data port 805 processes received information and controls the operation of the local terminal 835. Also coupled to the controller 810 are a clock 815 for providing time values to the controller 810, a transmission database 825 for storing received messages that are to be transmitted in the geographic region of the sub-system 615 (FIG. 22), and a data entry device 820 by which a human operator can modify data stored by the terminal 835.

The local terminal 835 further includes a subscriber database 830 for storing subscriber records associated with pagers 640 that normally receive messages from the local terminal 835, and a roamer database 835 for storing subscriber records for those pagers 640 that have roamed into the sub-system 615 of the local terminal 835. When billing information for roamers is to be processed by the local terminal 835, the roamer database 835 preferably also includes identification information by which the home terminals for the roamers can be identified. This identification information can comprise, for instance, a telephone number indicative of the roamer's home terminal appended to the subscriber record for that roamer or even included as information within the subscriber record.

A system memory 840 is coupled to the controller 810 for storing operational parameters and firmware utilized in operating the local terminal 835. Preferably, the system memory 840 stores identification information, e.g., telephone numbers and/or locations, of other terminals 725, 630 within the communication system 600 (FIG. 1) as well as codes, such as an authorization code, an initiation code, a denial code, and a response code, employed for communicating with other terminals 725, 630.

According to the present invention, a requester 880 is coupled to the controller 810 for automatically requesting the subscriber record of a pager 640 when it is determined that the pager 640 is a roamer for which service is to be provided by the local terminal 835. A biller 875 is also coupled to the controller 810 for updating and periodically transmitting billing information about roamers to home terminals that normally transmit messages to the roamers. The requester 880 and the biller 875 can be implemented in firmware stored in the system memory 840 or, alternatively, in hardware capable of performing equivalent functions.

The controller 810 gathers information to be transmitted during each frame into address, vector, and message fields according to FLEX™ protocol. The information is then coupled to a message buffer 845 for temporarily storing the information until a time for further processing and transmission. Frames are transmitted in numeric sequence, so that while a current frame is being transmitted, information for the next frame to be transmitted is in the message buffer 845, and information for the next frame thereafter is being gathered by the controller 810. At the appropriate time, the information stored in the message buffer 845 is transferred to the encoder 850 for encoding the information into a conventional signaling format such as FLEX™.

The controller 810 next enables a frame sync generator 855, which generates the predetermined sync pattern that is transmitted at the start of each frame transmission. The sync pattern is multiplexed with the encoded information by the serial data splicer 860, which generates a message stream. The message stream is transmitted by a transmitter 865 as a radio signal for reception by pagers 640 located in the geographic region in which service is provided by the sub-system 615.

The normal processing of a message to be transmitted to a roamer can also include referencing the billing information included in the subscriber record for that roamer. When the billing information contains an indication that further service for the roamer is denied, such as when the subscriber has not paid for service, the message can be discarded from the transmission database 825 or stored without transmission for a certain amount of time to allow the subscriber to pay for service or correct billing errors at the home terminal 725.

Figure 26:
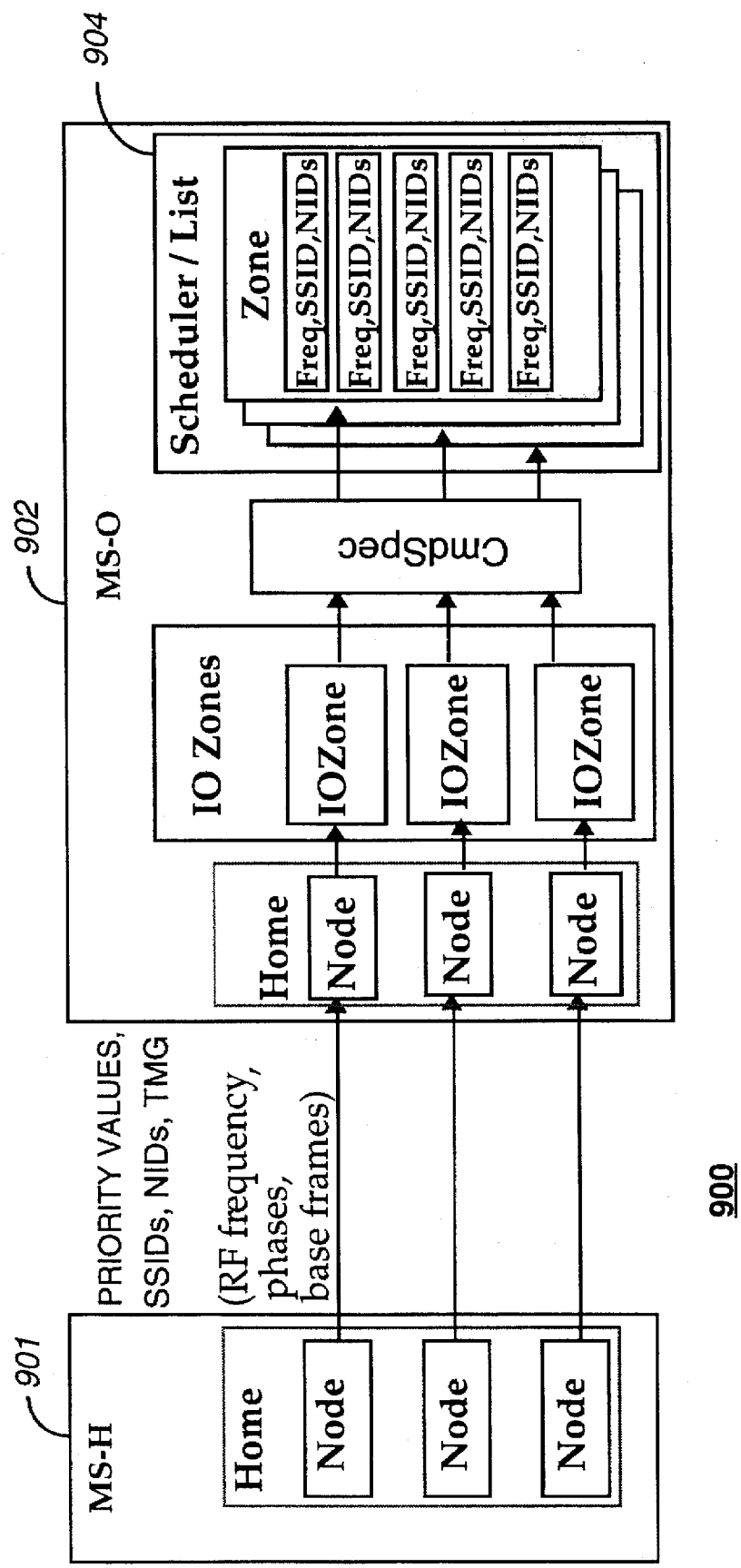
FIG. 26 is another system block diagram showing the coupling between the home input terminal and the output controller terminal in accordance with present invention.

Referring to FIG. 26, there is shown a efficient multi-frequency roaming and selective call messaging system 900 having a home input terminal 901 and a output controller terminal 902. Preferably, the system 900 uses network roaming identifiers (NIDs) associated with network wide frequencies and simulcast system identifiers (SSIDs) associated with local system frequencies for transmission of messages to a plurality of selective call receivers. The home input terminal 901 is preferably for storing a priority value assigned to at least one NID or at least one SSID for at least one of the plurality of selective call receivers in a subscriber database. The output controller terminal is networked to the home input terminal and receives the priority value and an associated message from the home input terminal. The output controller terminal matches the at least one NID or the at least one SSID on at least one of the available communication resources and then the output controller allows the transmission of the associated message on the at least one of the available communication resources if no congestion is detected on the at least one of the available communication resources. The system 900 preferably includes a congestion control list 904 at the output control terminal 902 containing the at least one available communication resource that is deemed congested. As shown in the terminals 725 and 835 of FIGS. 23 and 25 respectively, a messaging system like system 900 may also include a transmitter for transmitting the associated message on at least one of the available communication resources matching the highest priority value to the at least one NID or the at least one SSID having the highest priority value. Again, the communication resource is preferably selected from the group of FLEX™ protocol communication resources comprising frequencies, phases, base frame family, and traffic management group, but of course other communication resources can be used within the scope and spirit of the present invention.

Again referring to FIG. 26, a message can be directed to multiple frequencies/channel IDs even if these frequencies have the same simulcast footprint in a roaming FLEX system as shown in FIG. 18. In general, when a message can be directed to multiple output points, a method or communication protocol is required between the home input terminal and output controller terminal to specify which output points (communication resources or more specifically in examples shown, frequencies) are congested. The home input terminal can then just retry the message on the congested output points (frequencies). For FLEX systems, it is also desirable to apply congestion control down to phases, base frame families, and traffic management group/flag.

With the present invention, the home input terminal (shown as MS-H in FIG. 26) determines a list of nodes to send the page according to a pager scan list, a set of pager scanning rules, and registration information. This forms the destination ID/frequency list. The home input terminal then preferably sends the page to the destination node(s) with SSID (Simulcast System Identifier/TMG (Traffic Management Group; very similar to the Traffic Message Flag (TMF) or Traffic Splitting Flag (TSF)) list and/or NID (Network Identifier/TMG list specified. The output controller terminal (referred to as MS-O in FIG. 26) then routes the page to the forward channel with the matching SSIDs/TMF, NIDs/TMF (Traffic Management Flag), and/or frequencies with the highest priority. Then, for each forward channel selected, the message has to be placed in the right phase and base frame. This can be done by the scheduler shown in FIG. 26.

If congestion is detected in a phase/base frame family in a channel or for the whole channel when output controller terminal is routing the message to multiple channels, better congestion control can be achieved by having the output controller terminal put the IDs/frequency and phase/base frame family in a channel congestion list. As part of the response to the home input terminal, the output controller terminal specifies the congestion channel list and suggests a retry period for each channel/phase/base frame in the congestion control list.

Based on the congestion control list returned from the output controller terminal, the home input terminal can just retry the IDs/frequencies/phases/base frames that are congested based on the retry periods suggested by the output controller terminal. The following is an example of a possible congestion control list:

ID 1: retry period 60 seconds

ID 2/phase a: retry period 36 seconds

ID 3/base frame bf: retry period 50 seconds frequency 1: retry period 120 seconds It should be appreciated that the same idea can be applied to multiple node/zone messaging and to multiple output points for the same message in general.

Figure 27:
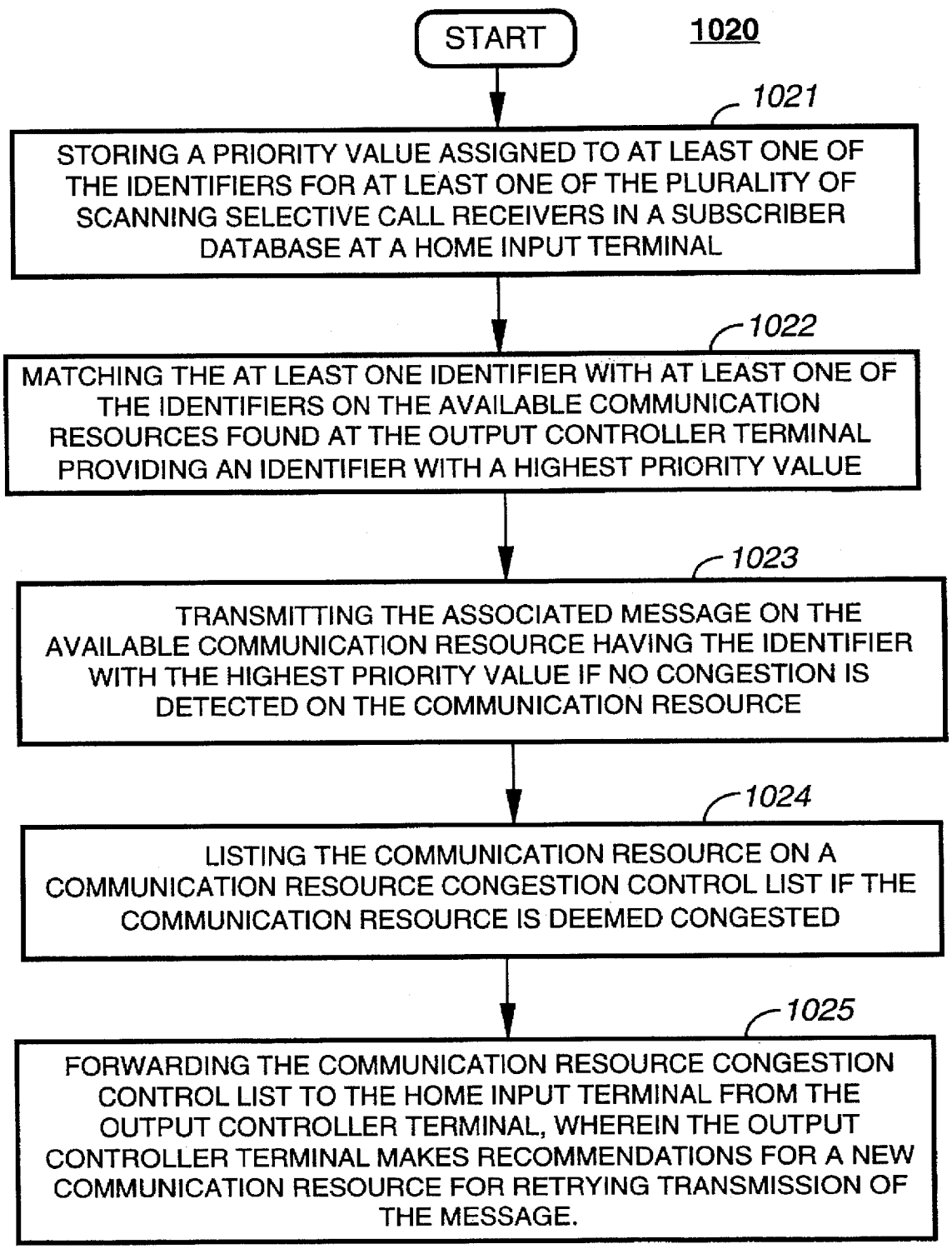
FIGS. 27-29 are flow charts illustrating a congestion control method in accordance with the present invention.

Referring to FIG. 27, a flow chart for a congestion control method 1020 for a messaging system having a plurality of scanning selective call receivers with roaming capability is shown. The method preferably comprises a first step 1021 of storing a priority value assigned to at least one of the identifiers for at least one of the plurality of scanning selective call receivers in a subscriber database at a home input terminal. Then at step 1022, the at least one identifier is matched with at least one of the identifiers on the available communication resources found at the output controller terminal providing an identifier with a highest priority value. At step 1023 the associated message is transmitted on the available communication resource having the identifier with the highest priority value if no congestion is detected on the communication resource. Then, at step 1024, if the communication resource is deemed congested, then the communication resource is listed on a communication resource congestion control list. The method 1020 can further comprise the step 1025 of forwarding the communication resource congestion control list to the home input terminal from the output controller terminal, wherein the output controller terminal makes recommendations for a new communication resource for retrying transmission of the message. Then, if no congestion is detected on the new communication resource, then the associated message is transmitted on the available communication resource having the identifier with the highest priority value. Additionally, the method could further comprise the step of reinitiating at the home input terminal on a new communication resource the message associated with the communication resource on the communication resource congestion control list. As explained before the communication resource is preferably any combination of frequency, phase, base frame, or traffic management group in a FLEX™ protocol structure, but other communication resources could be utilized to accommodate other protocols.

Figure 28:
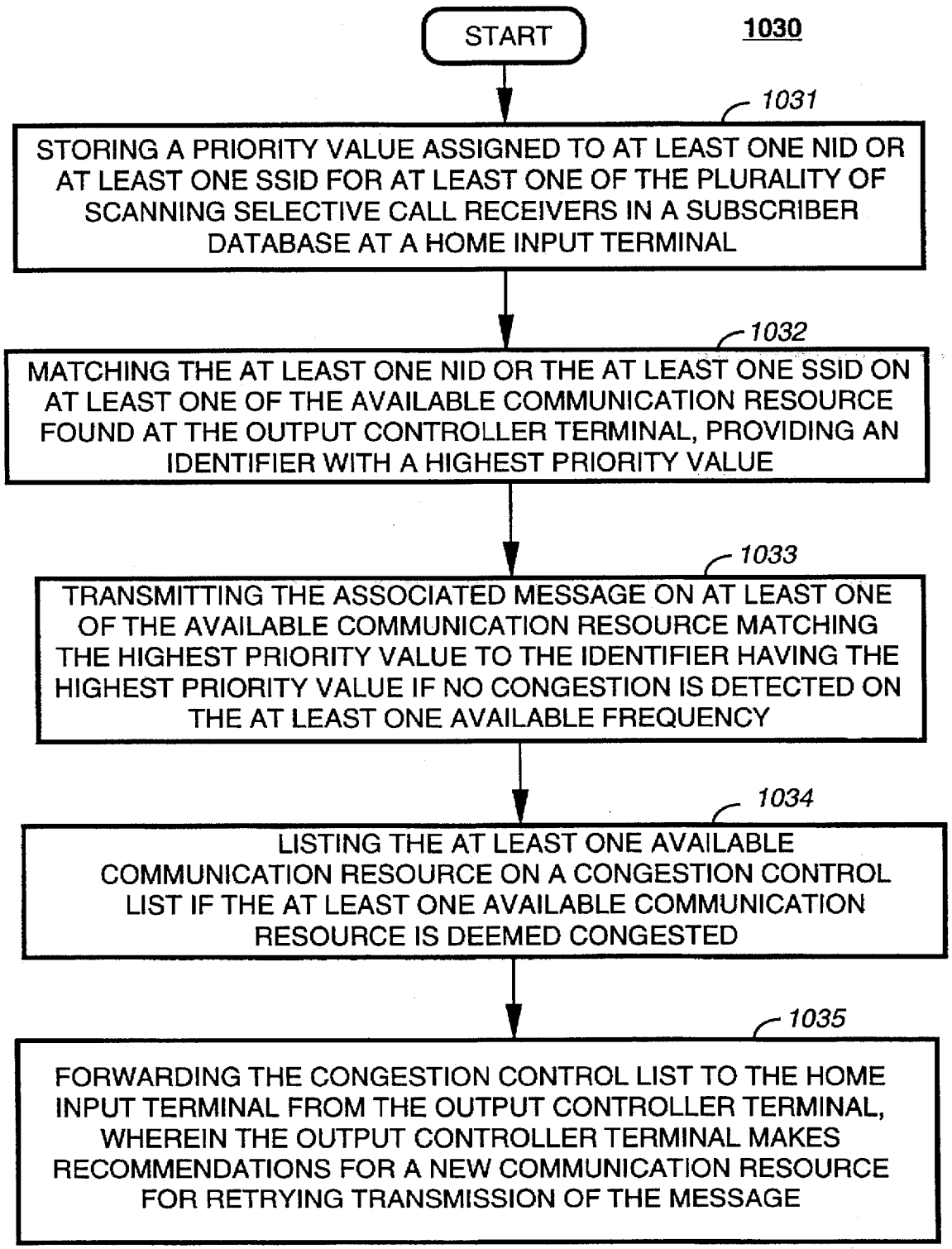

Referring to FIG. 28, a flow chart for a congestion control method 1030 for a messaging system having a plurality of scanning selective call receivers with roaming capability using network roaming identifiers (NIDs) associated with network wide frequencies and simulcast system identifiers (SSIDs) associated with local system frequencies is shown. The method 1030 preferably comprises a first step 1031 of storing a priority value assigned to at least one NID or at least one SSID for at least one of the plurality of scanning selective call receivers in a subscriber database at a home input terminal. Then, at step 1032 the at least one NID or the at least one SSID is matched with identifiers on at least one of the available communication resources found at the output controller terminal, providing an identifier with a highest priority value. Then, at step 1033, the associated message is transmitted on at least one of the available communication resources matching the highest priority value to the identifier having the highest priority value if no congestion is detected on the at least one available frequency. At step 1034, the at least one available communication resource is listed on a congestion control list if the at least one available communication resource is deemed congested. The method can further comprise the step of reinitiating at the home input terminal on a new communication resource the message associated with the communication resource on the congestion control list. Then, the associated message can be transmitted on the available communication resource having the identifier with the highest priority value if no congestion is detected on the new communication resource. Preferably, the method further comprises the step 1035 of forwarding the congestion control list to the home input terminal from the output controller terminal, wherein the output controller terminal makes recommendations for a new communication resource for retrying transmission of the message.

Figure 29:
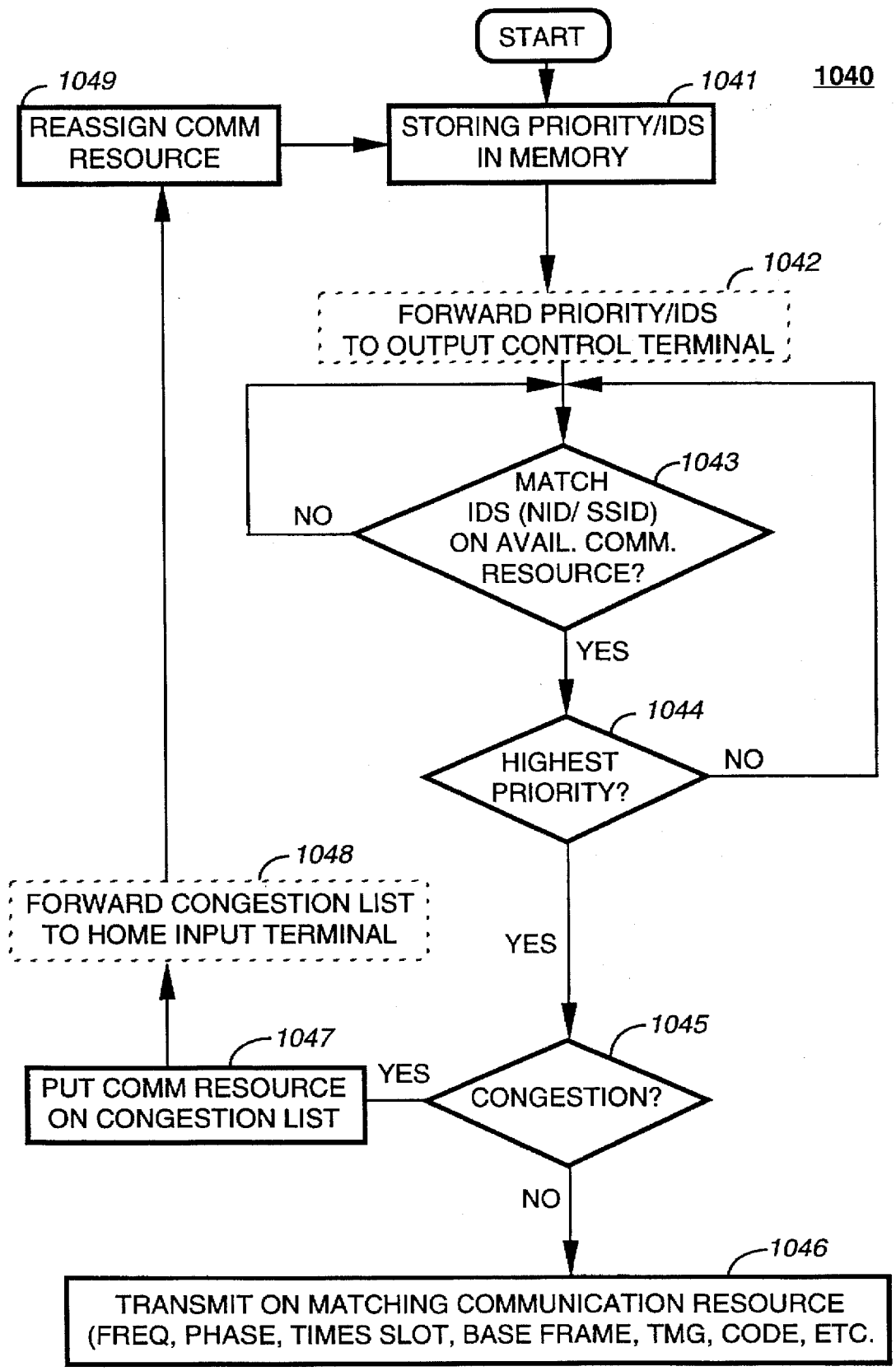

Referring to FIG. 29, another flow diagram depicting the congestion control method 1040 in accordance with the present invention. At step 1041, priorities and associated identifiers are stored in a memory, preferably a subscriber database. Optionally, the priorities and identifiers are forwarded to an appropriate output control terminal at step 1042. Next, at decision block 1043, a match between the identifier stored in memory and an identifier available on a communication resource is either found and the method progresses to decision block 1044 or no match is found and the method returns to decision block 1043. At step 1044, it is determined if the match is the highest priority. If no highest priority match is found the method could return to decision block 1043. If the highest priority match(es) is found, then the method progresses to decision block 1045, where it is determined if there is congestion on the communication resource. If there is no congestion on the communication resource, the message is then transmitted at step 1046. If congestion is found on the communication resource, then at step 1047, the communication resource is place on a congestion list. Optionally, at step 1048, the congestion list is forwarded to the home input terminal. In any event, at step 1049, the communication resource is reassigned, typically to another time period, frequency, based frame or phase for example.

Figure 30:
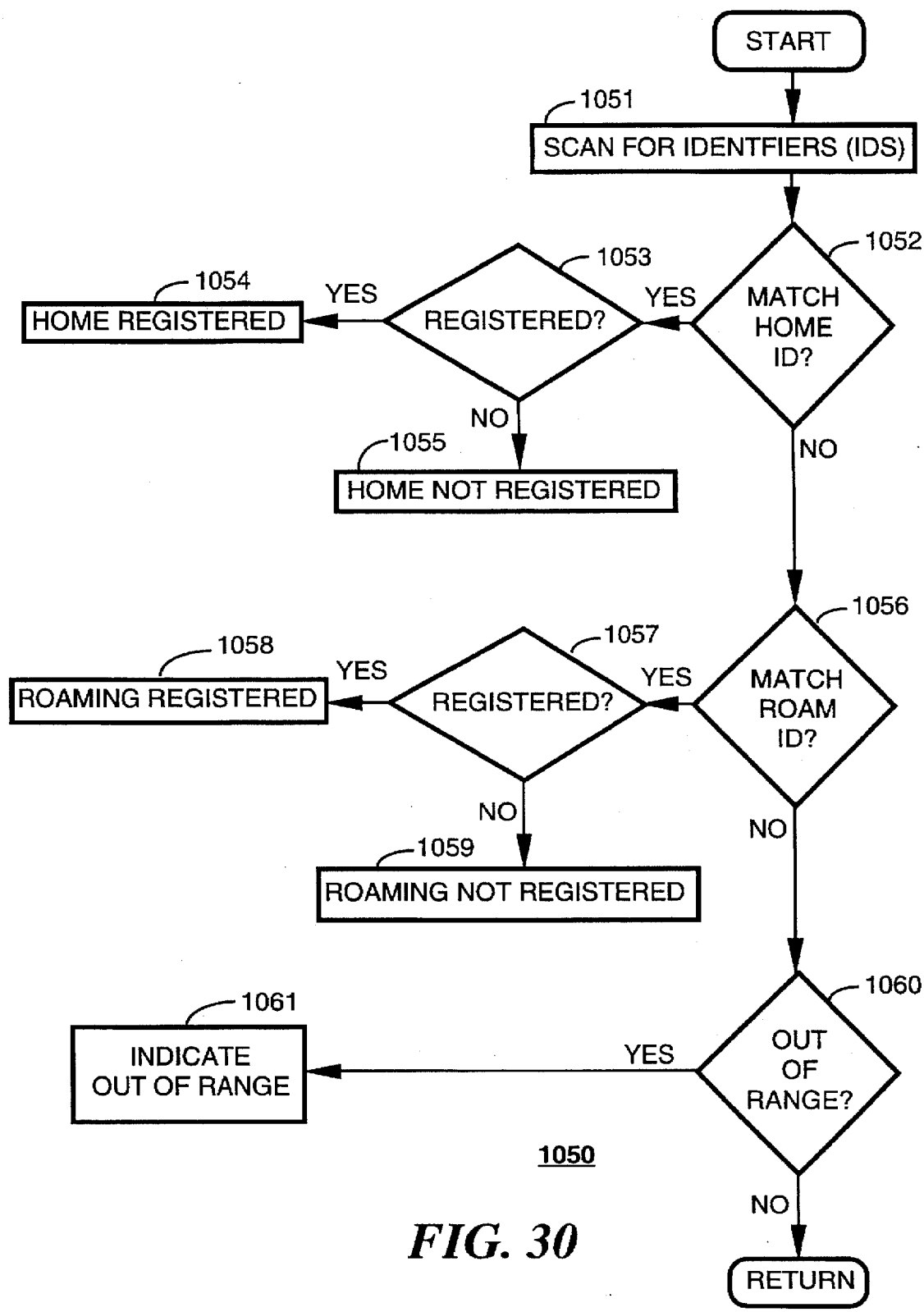
FIG. 30 is a flow chart illustrating a method of indicating a registration status to a one-way selective call receiver in accordance with the present invention.

Referring to FIG. 30, a flow chart illustrates a method 1050 for receiving a registration status indication at a one-way roaming selective call receiver. The method preferably comprises the step 1051 of scanning a predetermined set of communication resources for an identifier broadcast on the communication resource that matches an identifier stored at the one-way roaming selective call receiver. If a match is found at decision block 1052 and it is determined at decision block 1053 that the pager user is registered, then at step 1054, an indication of being registered in a "home" zone is shown if an identifier transmitted on the communication resource matches a "home" zone identifier stored in the one-way roaming selective call receiver, otherwise, an indication at step 1055 of home, but not registered is shown. An indication of "home, but not registered" can mean several things. First, it may mean that there is no registration at home to begin with or it can mean that the user was registered as a valid or registered "roaming" user, but never switched back for "home" registration. If no match is found at decision block 1052, then the method moves on to decision block 1056, where it is determined if an identifier transmitted on the communication resource matches a "roaming" zone identifier stored in the one-way roaming selective call receiver. If a match is found at decision block 1056 and it is determined at decision block 1057 that the pager user is registered, then at step 1058, an indication of being registered in a "roaming" zone is shown if an identifier transmitted on the communication resource matches a "roaming" zone identifier stored in the one-way roaming selective call receiver, otherwise, an indication at step 1059 of roaming, but not registered is shown. An indication of "roaming, but not registered" can have several meanings. It could mean that the user does not have roaming capability or that the user did not notify its home that it will be roaming. It could also mean that it was roaming in one zone and there was no information given to the home zone that the pager user is now in yet another different roaming zone which requires registration notification at the home input terminal. Finally, at decision block 1060, the selective call receiver determines whether it is out of range. If true, then the selective call receiver will give an indication that it is out of range. Otherwise, the method begins the process again. The method above could further provide the user an indication that the registration is about to lapse within a given period of time or about to begin within a period of time. In this way, the user is warned and is given the opportunity to take corrective action by call their respective home input terminals.

Referring once again to FIGS. 16 and 19, a one-way roaming selective call receiver unit having a registration status indicator is shown. The unit preferably comprises a selective call receiver (404) for receiving selective call messages, an antenna (402) coupled to the receiver and a decoder such as processor 408 coupled to the receiver for decoding the selective call messages. Further, the receiver unit preferably comprises a registration status indicator, comprising a first sensory alert providing an indication that an identifier broadcast on the communication resource matches an identifier stored at the one-way roaming selective call receiver for indicating that the one-way selective call receiver is registered in a "home" zone, a second sensory alert providing an indication that an identifier broadcast on the communication resource matches an identifier stored at the one-way roaming selective call receiver for indicating that the one-way selective call receiver is registered in a "roaming" zone, and a third sensory alert providing an indication of not being registered when the identifier transmitted on the communication resource does not match either the "home" zone identifier or the "roaming" zone identifier stored in the one-way roaming selective call receiver. Additionally, the registration status indicator can comprise a fourth sensory alert signifying an out of range indication when the signal strength of the communication resource being scanned by the roaming selective call receiver is insufficient for decoding. Alternatively, the fourth sensory alert can indicate the situation when the roaming selective call receiver roams from a first zone broadcasting a matching "home" zone indicator to a second zone broadcasting a matching "roaming" zone identifier, where the roaming selective call receiver is not registered for the second zone or the situation when the roaming selective call receiver roams from a first zone broadcasting a matching "roaming" zone indicator to a second zone broadcasting a matching "home" zone identifier, where the roaming selective call receiver is not registered for the second zone. The selective call receiver can also have a fourth indicator that indicates "roaming, but not registered" in the case where the user roams from one zone where the user is registered into a another roaming zone where the user is not registered. Preferably, the sensory alerts are selected from the group of icons on a display, alphanumeric messages on a display, differentiating audible alerts, or differentiating tactile alerts among others.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A method for efficient multi-frequency roaming and messaging for a plurality of selective call receivers in a selective call messaging system using identifiers on various communication resources recognized by at least one of the plurality of selective call receivers, comprising the steps of:

storing a priority value assigned to at least one of the identifiers for at least one of the plurality of selective call receivers in a memory at a home input terminal;

matching at least one identifier with at least one of the identifiers on a set of available communication resources found at an output controller terminal providing an identifier with a highest priority value; and transmitting an associated message on at least one of the set of available communication resources having the identifier with the highest priority value.

2. The method of claim 1, wherein the step of matching the at least one identifier with at least one of the set of available communication resources found at the output controller terminal is done at the home input terminal before the priority value, identifier, and associated message are subsequently forwarded to the output controller terminal.

3. The method of claim 1, wherein the method further comprises forwarding the priority value and an associated message and identifier to the output controller terminal before the matching step is done at the output controller terminal.

4. The method of claim 1, wherein the communication resource comprises a frequency.

5. The method of claim 1, wherein a communication resource from the set of available communication resources comprises a given frequency and time slot.

6. The method of claim 1, wherein the identifier comprise a network roaming identifier (NID) associated with network wide frequencies and simulcast system identifier (SSID) associated with local system frequencies.

7. A method for efficient multi-frequency roaming and messaging for a plurality of selective call receivers in a selective call messaging system using network roaming identifiers (NIDs) associated with network wide frequencies and/or simulcast system identifiers (SSIDs) associated with local system frequencies comprising the steps of:

storing a priority value assigned to at least one NID and/or at least one SSID for at least one of the plurality of selective call receivers in a subscriber database at a home input terminal;

forwarding the priority value and an associated message to an output controller terminal;

matching the at least one NID or the at least one SSID on at least one of a set of available frequencies at the output controller terminal; and transmitting the associated message on at least one of the set of available frequencies matching a highest priority value to the at least one NID or the at least one SSID having a highest priority value.

8. The method of claim 7, wherein the step of transmitting the associated messages comprises transmitting on more than one frequency if the priority values among the at least one NID or the at least one SSID are equal.

9. The method of claim 7, wherein the step of forwarding the priority value and the associated message to the output terminal is done when the particular selective call receiver user notifies the home input terminal that the user will be within the region of a particular output controller terminal or regions of more than one particular output controller terminal.

10. The method of claim 7, wherein the step of forwarding the priority value and the associated message to the output terminal is done when the particular selective call receiver user notifies the home input terminal that the user will be outside the region of the user's home input terminal.

11. The method of claim 7, wherein the step of forwarding the priority value and the associated message to the output terminal further comprises the step of forwarding the associated NIDs and SSIDs.

12. An efficient multi-frequency roaming and selective call messaging system using at least one identifier on various communication resources, the identifier stored and recognized by at least one of a plurality of selective call receivers used within the selective call messaging system, comprising:

a home input terminal for storing a priority value assigned to at least one identifier for at least one of the plurality of selective call receivers in a subscriber database; and an output controller terminal networked to the home input terminal for assigning communication resources and for receiving the priority value, the at least one identifier, and an associated message from the home input terminal, wherein the output controller terminal matches the identifier having a highest priority with the communication resource having the identifier at the output controller terminal.

13. The system of claim 12, wherein the system further comprises a transmitter for transmitting the associated message on the communication resource having the identifier with the highest priority.

14. The system of claim 12, wherein the communication resource comprises a frequency.

15. The system of claim 12, wherein the communication resource comprises a given frequency and time slot.

16. The system of claim 12, wherein the identifier comprise a network roaming identifier (NID) associated with network wide frequencies and a simulcast system identifier (SSID) associated with local system frequencies.

17. The system of claim 12, wherein the messaging system is a one-way paging system using a time division multiplexed over-the-air paging protocol.

18. An efficient multi-frequency roaming and selective call messaging system using at least one identifier on various communication resources, the identifier stored and recognized by at least one of a plurality of selective call receivers used within the selective call messaging system, comprising:

a home input terminal for storing a priority value assigned to at least one identifier for at least one of the plurality of selective call receivers in a subscriber database; and an output controller terminal networked to the home input terminal for assigning communication resources, wherein the home input terminal matches the at least one identifier with a highest priority value with a known identifier on an available communication resource at the output controller terminal and then the home input terminal forwards the matched identifier and an associated message to the output controller terminal.

19. An efficient multi-frequency roaming and selective call messaging system using network roaming identifiers (NIDs) associated with network wide frequencies and simulcast system identifiers (SSIDs) associated with local system frequencies for transmission of messages to a plurality of selective call receivers, comprising:

a home input terminal for storing a priority value assigned to at least one NID and/or at least one SSID for at least one of the plurality of selective call receivers in a subscriber database; and an output controller terminal networked to the home input terminal for receiving the priority value and an associated message from the home input terminal, wherein the output controller terminal matches the at least one NID or the at least one SSID on at least one of the available frequencies at the output terminal.

20. The system of claim 19, wherein the system further comprises a transmitter for transmitting the associated message on at least one of the available frequencies matching the highest priority value to the at least one NID or the at least one SSID having the highest priority value.

* * * * *